(12) United States Patent
Cho et al.

(10) Patent No.: US 9,581,858 B2
(45) Date of Patent: Feb. 28, 2017

(54) MIRROR DISPLAY DEVICE

(71) Applicant: Samsung Display Co., Ltd., Yongin, Gyeonggi-Do (KR)

(72) Inventors: Jung-Hyun Cho, Seoul (KR); Kang-Min Kim, Hwaseong-si (KR); Moon Jung Baek, Seoul (KR); Hae Young Yun, Suwon-si (KR)

(73) Assignee: Samsung Display Co., Ltd. (KR)

( * ) Notice: Subject to any disclaimer, the term of this patent is extended or adjusted under 35 U.S.C. 154(b) by 40 days.

(21) Appl. No.: 14/339,326

(22) Filed: Jul. 23, 2014

(65) Prior Publication Data

US 2015/0177563 A1    Jun. 25, 2015

(30) Foreign Application Priority Data

Dec. 23, 2013    (KR) .................. 10-2013-0161684

(51) Int. Cl.
*G02F 1/1335*    (2006.01)
*G02F 1/1347*    (2006.01)

(52) U.S. Cl.
CPC ...... *G02F 1/133536* (2013.01); *G02F 1/1347* (2013.01); *G02F 2001/133557* (2013.01); *G02F 2203/055* (2013.01)

(58) Field of Classification Search
CPC ................................................. G02F 1/133536
USPC ........................................................... 349/96
See application file for complete search history.

(56) References Cited

U.S. PATENT DOCUMENTS

| | | | |
|---|---|---|---|
| 5,986,730 A * | 11/1999 | Hansen | G02F 1/13362 349/117 |
| 6,710,831 B1 | 3/2004 | Winker et al. | |
| 7,057,681 B2 | 6/2006 | Hinata et al. | |
| 7,495,719 B2 | 2/2009 | Adachi et al. | |
| 7,903,335 B2 | 3/2011 | Nieuwkerk et al. | |
| 2004/0100598 A1* | 5/2004 | Adachi | G02F 1/133536 349/113 |
| 2007/0070508 A1* | 3/2007 | Ruhle | G02B 5/3016 359/630 |
| 2008/0309852 A1* | 12/2008 | O'Donnell | G02F 1/133536 349/74 |
| 2010/0026920 A1* | 2/2010 | Kim | H04N 13/0404 349/15 |

(Continued)

FOREIGN PATENT DOCUMENTS

| | | |
|---|---|---|
| JP | 11-174437 | 7/1999 |
| JP | 2007-505338 A | 3/2007 |

(Continued)

*Primary Examiner* — Sang V Nguyen
(74) *Attorney, Agent, or Firm* — Innovation Counsel LLP

(57) ABSTRACT

A display device is provided. The display device includes: a display panel; and a polarization conversion panel disposed on the display panel, wherein the polarization conversion panel includes: a reflective polarizer disposed on the display panel, an absorptive polarizer facing and spaced apart from the reflective polarizer, a lower electrode disposed on the reflective polarizer, an upper electrode disposed on the absorptive polarizer, and a liquid crystal layer disposed between the upper and lower electrodes; and wherein the polarization conversion panel is configured to emit light having a fixed wavelength range depending on a voltage difference generated between the upper and lower electrodes.

16 Claims, 31 Drawing Sheets

(14 of 31 Drawing Sheet(s) Filed in Color)

(56) References Cited

U.S. PATENT DOCUMENTS

| | | | |
|---|---|---|---|
| 2011/0141411 A1 | 6/2011 | Park et al. | |
| 2011/0199561 A1* | 8/2011 | Hasegawa | G02B 5/30 349/96 |
| 2011/0261299 A1* | 10/2011 | Tai | G02B 27/26 349/98 |
| 2011/0273659 A1* | 11/2011 | Sobecki | B60R 1/088 349/195 |
| 2012/0075565 A1* | 3/2012 | Kaise | G02F 1/133707 349/139 |
| 2012/0127394 A1* | 5/2012 | Nakao | G02F 1/13471 349/61 |
| 2012/0162592 A1* | 6/2012 | Takagi | G02B 27/2214 349/139 |
| 2012/0314180 A1* | 12/2012 | Hashimoto | G02F 1/134309 349/194 |
| 2015/0085002 A1* | 3/2015 | Li | G02B 27/286 345/697 |

FOREIGN PATENT DOCUMENTS

| | | |
|---|---|---|
| KR | 10-2010-0082557 A | 7/2010 |
| KR | 10-2011-0032340 A | 3/2011 |
| KR | 10-2012-0046990 A | 5/2012 |
| KR | 10-2013-0003384 A | 1/2013 |
| KR | 10-1251403 B1 | 4/2013 |

* cited by examiner

MIRROR DISPLAY DEVICE

CROSS-REFERENCE TO RELATED APPLICATION

This application claims priority to and the benefit of Korean Patent Application No. 10-2013-0161684 filed in the Korean Intellectual Property Office on Dec. 23, 2013, the entire contents of which are incorporated herein by reference.

BACKGROUND (a) Technical Field

The present disclosure relates to a mirror display device.

(b) Description of the Related Art

A liquid crystal display device is currently one of the most widely used flat panel display devices. A liquid crystal display device typically includes two display panels on which electric field generating electrodes (such as a pixel electrode and a common electrode) are formed, and a liquid crystal layer interposed between the two display panels.

An electric field is generated over the liquid crystal layer by applying a voltage to the field generating electrodes. The electric field determines the alignment of liquid crystal molecules in the liquid crystal layer and controls polarization of incident light through the liquid crystal layer, thereby allowing an image to be displayed on the liquid crystal display device.

Generally, personal hand-held terminals or liquid crystal display devices for outdoor display purposes should be portable to meet user needs. In recent years, a mirror film has been incorporated into some personal hand-held terminals or liquid crystal display devices, so as to provide an additional mirror function (which allows the personal hand-held terminals or liquid crystal display devices to serve as a mirror when the liquid crystal display is in an off-state).

The mirror function is achieved as follows. When the mirror film receives light from different external light sources, the mirror film only allows linearly polarized light in a specific direction to be transmitted, while linearly polarized light in other directions is reflected from a surface of the mirror film.

Accordingly, the liquid crystal display device can be used to display an image when it is driven as a display device, or as a mirror when it is not driven as a display device.

The information disclosed in this Background section is to aid in understanding the background of the inventive concept and may contain information that does not form the prior art that is already known in this country to a person of ordinary skill in the art.

SUMMARY

The present inventive concept relates to a display device including a mirror mode, and more particularly to a mirror mode for displaying various colors in the display device.

According to some embodiments of the inventive concept, a display device is provided. The display device includes: a display panel; and a polarization conversion panel disposed on the display panel, wherein the polarization conversion panel includes: a reflective polarizer disposed on the display panel, an absorptive polarizer facing and spaced apart from the reflective polarizer, a lower electrode disposed on the reflective polarizer, an upper electrode disposed on the absorptive polarizer, and a liquid crystal layer disposed between the upper and lower electrodes; and wherein the polarization conversion panel is configured to emit light having a fixed wavelength range depending on a voltage difference generated between the upper and lower electrodes.

In some embodiments, the light having the fixed wavelength range may include a plurality of wavelengths, and wherein a phase difference value provided by the liquid crystal layer may change according to the voltage difference, and a degree of phase delay for each wavelength may vary depending on the changing phase difference value.

In some embodiments, the light of the fixed wavelength range may exhibit a predetermined interference color.

In some embodiments, at least one of the upper and lower electrodes may include a plurality of sub-electrodes electrically separated from each other, and the plurality of sub-electrodes may be divided into at least two regions according to voltages applied thereto.

In some embodiments, the lower electrode may include: a plurality of first sub-electrodes spaced apart by a predetermined interval; an insulation layer disposed on the plurality of first sub-electrodes; and a plurality of second sub-electrodes spaced apart from each other and disposed on the insulation layer so as to cross the plurality of first sub-electrodes.

In some embodiments, the upper electrode may include: a plurality of first sub-electrodes spaced apart by a predetermined interval; an insulation layer disposed on the plurality of first sub-electrodes; and a plurality of second electrodes spaced apart from each other and disposed on the insulation layer so as to cross the plurality of first sub-electrodes.

In some embodiments, the lower electrode may include: a first sub-electrode; an insulation layer disposed on the first sub-electrode; and a second sub-electrode disposed on the insulation layer, wherein one of the first and second sub-electrodes may have a planar shape, and the other one of the first and second sub-electrodes may have a plurality of linear shapes.

In some embodiments, the upper electrode may include: a first sub-electrode; an insulation layer disposed on the first sub-electrode; and a second sub-electrode disposed on the insulation layer, wherein one of the first and second sub-electrodes may have a planar shape, and the other one of the first and second sub-electrodes may have a plurality of linear shapes.

In some embodiments, the upper and lower electrodes may be formed of a transparent conductive oxide (TCO).

In some embodiments, the at least two regions may be independently driven.

In some embodiments, the display device may further include: a first polarizer disposed between the display panel and the reflective polarizer, wherein a transmissive axis of the first polarizer and a transmissive axis of the reflective polarizers may coincide with each other.

In some embodiments, the transmissive axis of the reflective polarizer may be perpendicular to the transmissive axis of the absorptive polarizer.

In some embodiments, the transmissive axis of the reflective polarizer may be parallel to the transmissive axis of the absorptive polarizer.

In some embodiments, a reflective axis of the reflective polarizer may be perpendicular to the transmissive axis of the reflective polarizer.

In some embodiments, the display device may further include: a second polarizer disposed under the display panel, and a light unit disposed under the second polarizer.

In some embodiments, the display panel may include at least one of a liquid crystal display (LCD) panel, a plasma display panel (PDP), an organic light emitting diode display (OLED) panel, a surface conduction electron-emitter display (SED) panel, and a field emission display (FED) panel.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
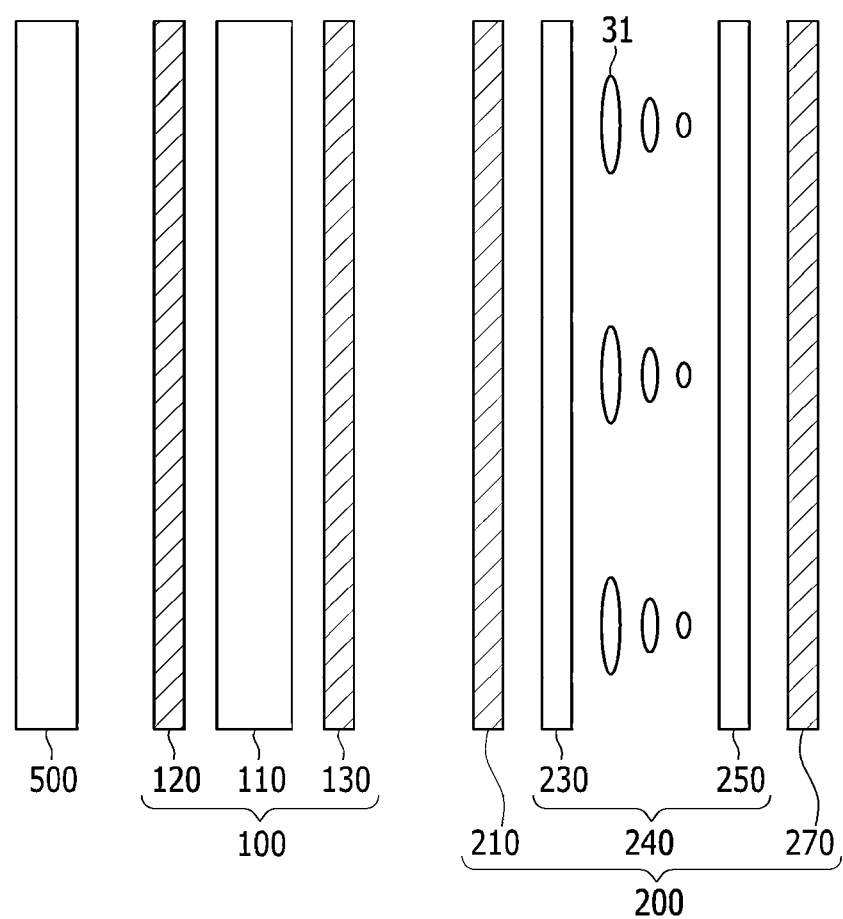
FIG. 1 is a schematic cross-sectional view of a display device according to an exemplary embodiment of the inventive concept.

The present inventive concept will be described more fully herein with reference to the accompanying drawings, in which exemplary embodiments are shown. As those skilled in the art would realize, the described embodiments may be modified in various different ways without departing from the spirit or scope of the present disclosure.

In the drawings, the thickness of layers, films, panels, regions, etc., may be exaggerated for clarity. Like reference numerals designate like elements throughout the specification.

It will be understood that when an element such as a layer, film, region, or substrate is referred to as being "on" another element, it can be disposed directly on the other element, or with one or more intervening elements being present. In contrast, when an element is referred to as being "directly on" another element, there are no intervening elements present.

Referring to FIG. 1, a display device according to an exemplary embodiment of the inventive concept includes a display panel 100 and a phase delay panel 200.

The display panel 100 may include a liquid crystal panel 110 for displaying an image, and polarizers 120 and 130 positioned on opposite sides of the liquid crystal panel 110. The liquid crystal panel 110 may include a lower substrate including a first insulation substrate, an upper substrate including a second insulation substrate which faces the first insulation substrate, and a liquid crystal layer interposed between the lower and upper substrates.

A plurality of pixel electrodes may be disposed on the first insulation substrate and arranged in a matrix form.

Though not illustrated in the drawings, the first insulation substrate 110 may further include gate lines extending in a row direction, data lines extending in a column direction, and thin film transistors connected to the corresponding pixel electrodes.

A color filter and a common electrode are disposed on the second insulation substrate.

The color filter may include red, green, and blue color filters R, G, and B. Each of the color filters R, G, and B may be disposed corresponding to a pixel electrode.

The common electrode is disposed on the color filter. A vertical electric field is generated by the common electrode in conjunction with the pixel electrodes.

The liquid crystal layer includes a plurality of liquid crystal molecules. An alignment direction of the liquid crystal molecules in the liquid crystal layer is controlled by the vertical electric field.

Depending on the alignment of the liquid crystal molecules, an image may be displayed by controlling transmittance of light received from a light unit 500.

Although the above embodiment has been described with reference to a liquid crystal display panel, it should be noted that the inventive concept is not limited thereto. In some other embodiments, the display panel may include a display device such as a plasma display panel (PDP), an organic light emitting diode display (OLED) device, a surface conduction electron-emitter display (SED), a field emission display (FED), a vacuum fluorescent display (VFD), an e-paper, and the like.

Referring to FIG. 1, the first and second polarizers 130 and 120 are positioned on opposite sides of the liquid crystal panel 110 so as to polarize incident light received from the light unit 500.

In some embodiments, a transmissive axis of the first polarizer 130 may coincide with a transmissive axis of a reflective polarizer 210 positioned between the phase delay panel 200 and the liquid crystal panel 110.

For the image displayed on the liquid crystal panel 110 to be transmitted to a user through the reflective polarizer 210, the transmissive axes of the reflective polarizer 210 and the first polarizer 130 should be disposed parallel with each other.

In some embodiments, the light unit 500, and also the first and second polarizers 130 and 120, may be included as part of the display panel 100.

The light unit 500 may include a light source positioned under the second polarizer 120 for emitting light, and a light guide plate (not illustrated) for guiding the received light toward the display panel 100 and the phase delay panel 200.

In some embodiments, the light source may include at least one light emitting diode (LED), and the LED may be disposed on at least one lateral side of the light guide plate. Accordingly, in those embodiments, the light source may include an edge-type light unit positioned at the lateral side of the light guide.

However, it should be noted that the light unit 500 is not limited to the above-described embodiments. In some other embodiments, the light unit 500 may be of a direct-type structure in which the light source is positioned right under a diffusion plate (not shown), and the light source may include a fluorescent lamp instead of a light emitting diode (LED).

Although the display panel 100 has been described with reference to a liquid crystal display panel, it should be noted that the inventive concept is not limited thereto. For example, in some other embodiments, the display panel 100 may include an organic light emitting diode display panel.

Accordingly, in those other embodiments, the polarizers 120 and 130 and the light unit 500 may be omitted.

The phase delay panel 200 includes the reflective polarizer 210 disposed on the first polarizer 130 of the display panel 100, a lower electrode 230 disposed on the reflective polarizer 210, an upper electrode 250 facing and spaced apart from the lower electrode 230, and an absorptive polarizer 270 disposed on the upper electrode 250. A liquid crystal layer 3 including liquid crystal molecules 31 is disposed in a space between the lower and upper electrodes 230 and 250. The lower and upper electrodes 230 and 250, and the liquid crystal layer 3 disposed therebetween, collectively form a constituent element 240. As shown in FIG. 1, the constituent element 240 is disposed between the reflective polarizer 210 and the absorptive polarizer 270, with the separate polarizers 210 and 270 positioned on opposite sides of the phase delay panel 200.

A transmissive axis of the reflective polarizer 210 may be parallel to a transmissive axis of the first polarizer 130. The reflective polarizer 210 further includes a reflective axis extending in a direction perpendicular to its transmissive axis.

Light vibrating in a direction parallel to the transmissive axis of the reflective polarizer 210 is transmitted through the reflective polarizer 210. In contrast, light vibrating in a direction perpendicular to the transmissive axis of the reflective polarizer 210 (that is, in a direction parallel to the reflection axis) is reflected from a surface of the reflective polarizer 210.

A reflective polarization film may be used as the reflective polarizer 210. The reflective polarization film may include a dual brightness enhancement film (DBEF), a wire grid polarizer (WGP), or a $TiO_2$ multilayer film, but is not limited thereto.

In some embodiments, the reflective polarizer 210 may have a predetermined haze value such that the reflective polarizer 210 can easily scatter incident or emitting light. In those embodiments, the display device is capable of displaying bright colors with a fixed range of implemented colors.

The lower and upper electrodes 230 and 250 may be disposed between the reflective and absorptive polarizers 210 and 270. The lower and upper electrodes 230 and 250 may be formed of, for example, a transparent conductive oxide (TCO).

Referring to FIG. 1, the lower and upper electrodes 230 and 250 may be formed having a planar shape, but are not limited thereto. In some embodiments, one of the lower and upper electrodes 230 and 250 may include a plurality of sub-electrodes as linear members.

In some embodiments, a voltage may be applied to the lower and upper electrodes 230 and 250. In some other embodiments, multiple combinations of voltages (having various voltage differences) may be applied between the lower and upper electrodes 230 and 250 such that more than one ON/OFF state may be possible.

The liquid crystal layer 3 including the liquid crystal molecules 31 is disposed between the lower and upper electrodes 230 and 250.

In the above-described embodiments, the liquid crystal layer 3 is aligned in a twist-nematic mode. Nevertheless, the inventive concept is not limited thereto. In some other embodiments, the liquid crystal layer 3 may be aligned in various modes (such as an electrically controlled birefringence (ECB) mode, a vertical alignment (VA) mode, and the like).

A predetermined electric field may be generated between the lower and upper electrodes 230 and 250 to realign the liquid crystal molecules 31 in the liquid crystal layer 3.

Particularly, the rotation and phase delay of incident light toward the phase delay panel 200 can be controlled by adjusting the electric field between the lower and upper electrodes 230 and 250 from 0 V to a predetermined voltage.

When the electric field applied to the liquid crystal molecules 31 is changed by varying the voltage applied to the liquid crystal layer 3 (as described above), the alignment state of the liquid crystal molecules 31 in the liquid crystal layer 3 changes according to the varying electric field.

The refraction of light in the liquid crystal layer 3 is influenced by the changes in the alignment state of the liquid crystal molecules 31, such that light of different wavelengths is converted into a first set of oval polarized lights each having a different polarization state.

The first set of oval polarized lights is partially reflected by the reflective polarizer 210 and passes through the liquid crystal layer 3 a second time.

After the first set of oval polarized lights passes through the liquid crystal layer 3 the second time, the first set of oval polarized lights are converted into a second set of oval polarized lights depending on the alignment state of the liquid crystal molecules 31 at the instance of the second passing.

Accordingly, light of different wavelengths each having different intensities can be implemented using predetermined colors.

Thus, a polarization conversion panel may emit light having a predetermined wavelength range according to the voltage differences applied between the lower and upper electrodes. Likewise, by adjusting the voltage differences applied between the lower and upper electrodes, the polarization conversion panel can also block light having a predetermined wavelength range.

Accordingly, by varying the electric field applied to the liquid crystal molecules 31, the polarization of light may be changed so as to exhibit various colors.

The phase delay of each wavelength can be expressed by a formula $\Delta\phi = \Delta n * d * 2\pi/\lambda$, wherein $\Delta\phi$ represents the phase delay of each wavelength, $\Delta n$ represents the refractive index, d represents a width of the phase delay panel 200, and $\lambda$ represents the wavelength.

In some embodiments, the refractive index $\Delta n$ may be changed by varying the voltage applied to the liquid crystal layer 3 such that the degree of phase delay $\Delta\phi$ varies by each wavelength $\lambda$.

Accordingly, light having a predetermined wavelength range may have different phase delays depending on the varying voltage differences applied to the liquid crystal layer 3. Specifically, the degree of phase delay for each wavelength varies depending on the varying phase delay value.

Thus, wavelengths having different phase delay degrees may interfere with each other to implement a predetermined interference color, such that a fixed range of colors can be implemented in a mirror mode.

As previously mentioned, the absorptive polarizer 270 has a transmissive axis.

The transmissive axis of the absorptive polarizer 270 may be perpendicular or parallel to the axis of the reflective polarizer 210 depending on the liquid crystal mode.

Light vibrating in a direction parallel to the transmissive axis of the absorptive polarizer 270 may pass through the absorptive polarizer 270, while light vibrating in a direction nonparallel to the transmissive axis is absorbed by the absorptive polarizer 270.

In some embodiments (not illustrated), the phase delay panel 200 may further include a wavelength plate disposed between the polarizers 210 and 270.

The wavelength plate serves to further refract light passing through the wavelength plate, by forming a fixed phase difference in addition to generating a fixed phase delay in the liquid crystal layer 3.

In some embodiments, the wavelength plate may result in a λ/4 phase difference, and the wavelength plate may be positioned between the polarizers 210 and 270.

Next, optical paths according to various liquid crystal modes will be described below with reference to FIGS. 2A to 4C.

Figure 2A:
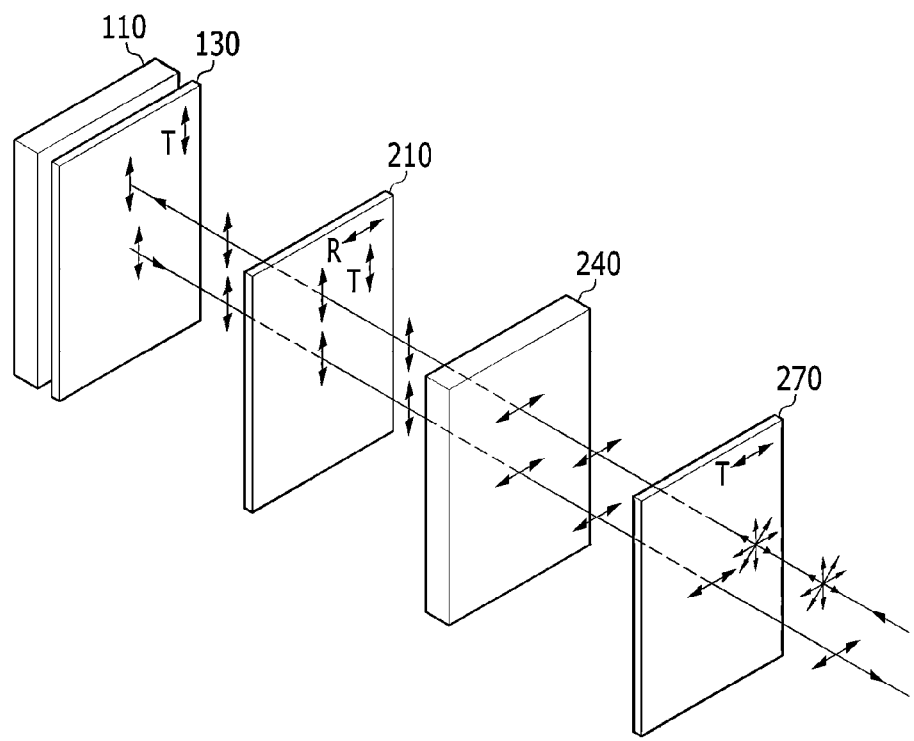
FIG. 2A to FIG. 2C are schematic views showing a liquid crystal of a TN mode in a phase delay panel (operated in a mirror mode) according to an exemplary embodiment of the inventive concept.
Figure 2B:
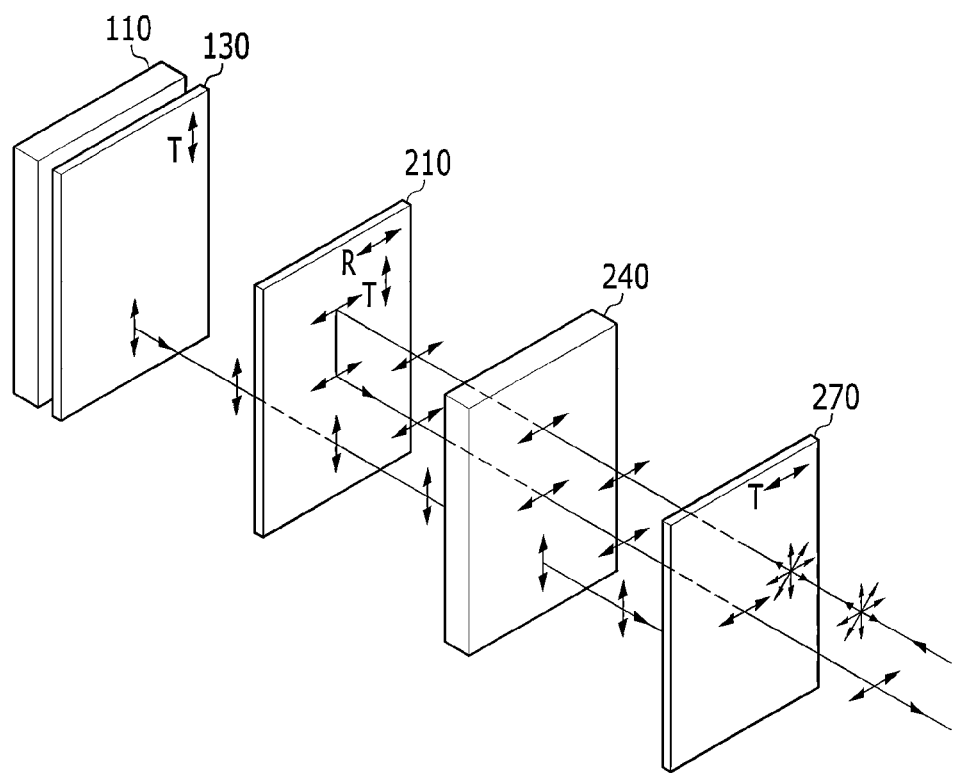
Figure 2C:
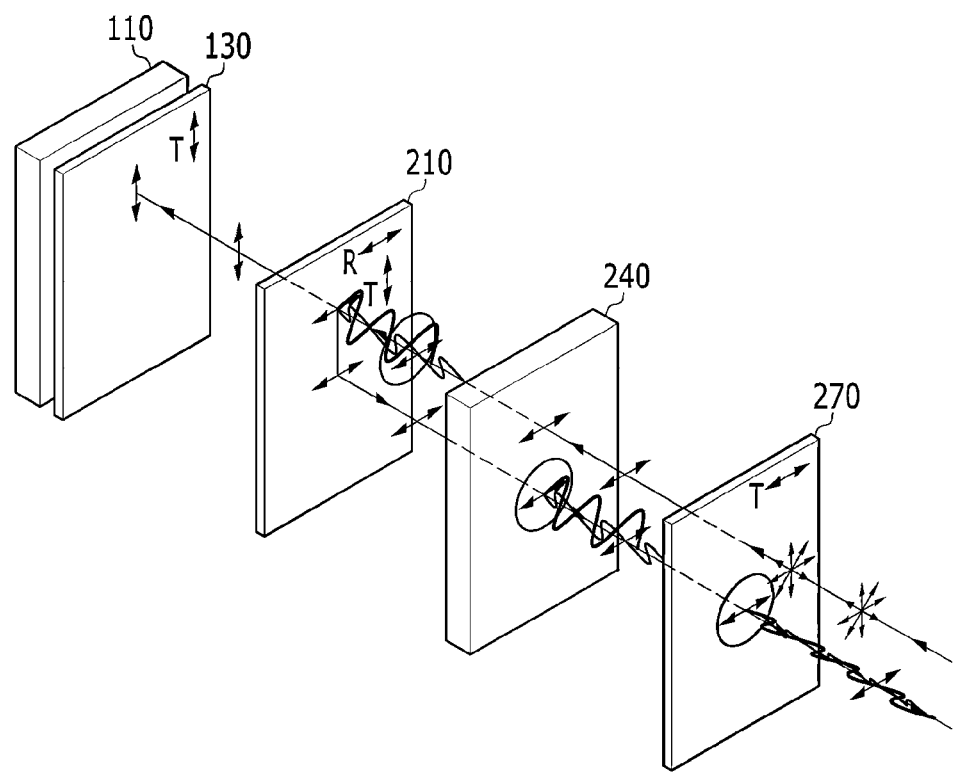

As shown in FIG. 2A to FIG. 2C, the liquid crystal is in a TN (twisted-nematic) mode, and the transmissive axes of the first polarizer 130 and the reflective polarizer 210 are parallel to each other while the transmissive axes of the reflective polarizer 210 and the absorptive polarizer 270 are perpendicular to each other.

Light transmission based on the configuration described above in FIGS. 2A to 2C will be described as follows.

First, FIG. 2A illustrates a case in which no voltage is applied (to the phase delay panel 200 in the TN mode).

When incident light from the outside arrives at the display panel, only light having a same polarization axis as the transmissive axis of the absorptive polarizer 270 passes through the absorptive polarizer 270, while light that does not have the same polarization axis as the transmissive axis of the absorptive polarizer 270 is absorbed by the absorptive polarizer 270.

Accordingly, referring to FIG. 2A, only light in the horizontal direction is transmitted through the absorptive polarizer 270.

The polarization axis of light that is polarized by the absorptive plate 270 in one direction is rotated by 90 degrees to pass through the liquid crystal of the TN mode (that is not applied with a voltage).

In some embodiments, the light rotated by 90 degrees has a vertical polarization axis.

The light having the vertical polarization axis has a polarization axis parallel to the transmissive axis of the reflective polarizer 210 such that the light is completely transmitted therethrough.

The light transmission principles described above apply equally to light emitting out of the display panel 100.

The light polarized by the display panel 100 and the first polarizer 130 has a polarization axis parallel to the transmissive axis of the first polarizer 130.

The transmissive axes of the first polarizer 130 and the reflective polarizer 270 are parallel to each other such that light transmitted through the first polarizer 130 also passes through the reflective polarizer 270.

A polarization axis of the light transmitted through the liquid crystal of the TN mode (that is not applied with a voltage) is rotated by 90 degrees.

Thus, the light having the vertical polarization axis transmits therethrough while maintaining its horizontal polarization axis.

Since the transmissive axes of the reflective polarizer 210 and the absorptive polarizer 270 are perpendicular to each other, the horizontal polarization axis rotated by 90 degrees is parallel to the transmissive axis of the absorptive plate 270, thereby enabling the light to pass through the absorptive polarizer 270.

Thus, the light emitting out of the display panel 100 displays the image without additional conversion when no voltage is applied to the phase delay panel 200.

Next, FIG. 2B illustrates a case in which a voltage is applied (to the phase delay panel 200 in the TN mode).

Incident light arriving from the outside has polarization axes in all directions, but only light having a polarization axis in one direction passes through the absorptive polarizer 270 while the remainder of the light (having polarization axes in other directions) is absorbed by the absorptive polarizer 270.

In some embodiments, light is transmitted in a horizontal direction through the absorptive polarizer 270.

When a voltage is applied to the phase delay panel 200 in the TN mode, light having a predetermined polarization axis passes through the phase delay panel 200 while maintaining its polarization axis in the horizontal direction.

In some embodiments, the polarization axes of the reflective polarizer 210 and the absorptive polarizer 270 are perpendicular to each other, and the transmissive and reflection axes of the reflective polarizer 210 are perpendicular to each other.

In some embodiments, the transmissive and reflective axes of the reflective polarizer 210 lie in the vertical and horizontal directions, respectively. In those embodiments, light having its polarization axis in the horizontal direction is completely reflected because its polarization axis is parallel with the reflective axis.

After light is reflected from the reflective polarizer 210, the vibrating axis of the reflected light is rotated by 180 degrees. However, the linearly polarized light is unaffected by the 180 degree rotation, and still maintains its original vibrating axis even after the 180 degree rotation.

The transmittance property described above applies equally to light that is emitted to the outside after being reflected from the reflective polarizer 210.

According to the inventive concept, the phase delay panel 200 including the liquid crystal of the TN mode displays an image when no voltage is applied, and operates as a mirror when a voltage is applied.

When a voltage is applied between the lower and upper electrodes 230 and 250 to generate an electric field over the liquid crystal layer 3, the electric field may be adjusted to a predetermined voltage V so as to control the rotation and rotation degree of polarized light that is incident on the phase delay panel 200.

Specifically, as shown in FIG. 2C, when the electric field applied to the liquid crystal molecules 31 is changed by varying the voltage applied to the liquid crystal layer 3 disposed between the lower and upper electrodes 230 and 250, the alignment state of the liquid crystal molecules 31 is changed by the varying electric field.

Depending on the variations in the alignment state, refractive properties of the liquid crystal layer 3 are affected such that light having different wavelengths convert into oval polarized lights each having a different polarization state.

The oval polarized lights are partially reflected from the reflective polarizer 210 and transmitted through the liquid crystal layer 3 a second time.

In some embodiments, light passing through the liquid crystal layer 3 convert into the oval polarized lights by refraction such that light of different wavelengths each having different intensities can be used to implement predetermined colors.

That is, light transmitted through the absorptive polarizer 270 is limited to one polarization direction, but the wavelengths of light transmitted through the absorptive polarizer 270 may be sufficiently diverse to display a white color.

However, light transmitted through the liquid crystal layer 3 may have different phase values depending on its wavelengths. As a result, when light is reflected from the reflective polarizer 210 to be transmitted through an upper portion of the absorptive polarizer 270, light of a fixed range of wavelengths is generally transmitted while light of other wavelengths is absorbed.

Accordingly, specific colors may be displayed using the above-described embodiments.

Next, a liquid crystal of the ECB mode will be described with reference to FIG. 3A to FIG. 3C.

Figure 3A:
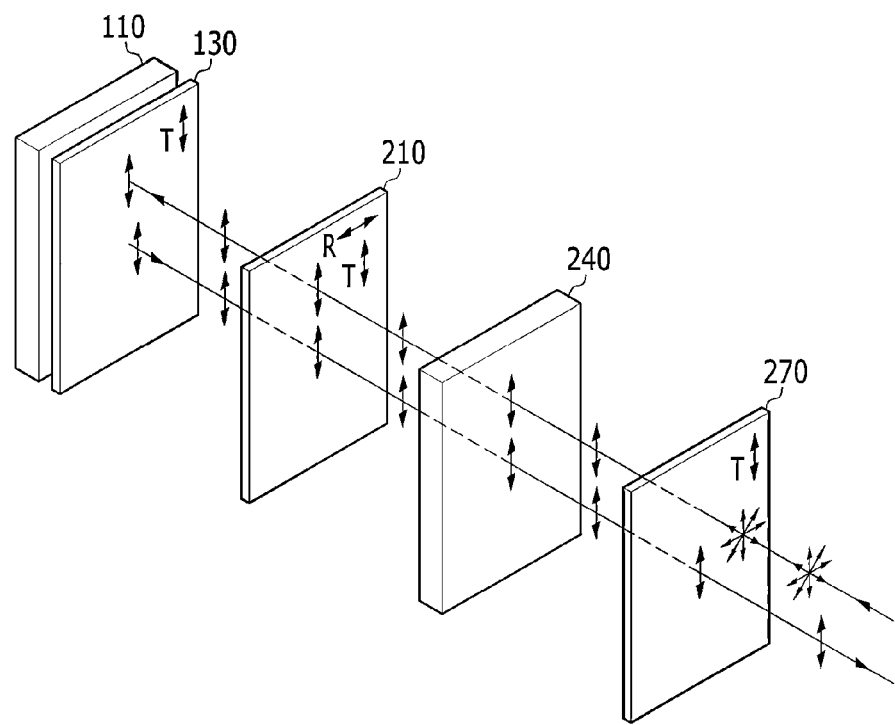
FIG. 3A to FIG. 3C are schematic views showing a liquid crystal of an ECB mode in a phase delay panel (operated in a transmissive mode) according to an exemplary embodiment of the inventive concept.
Figure 3B:
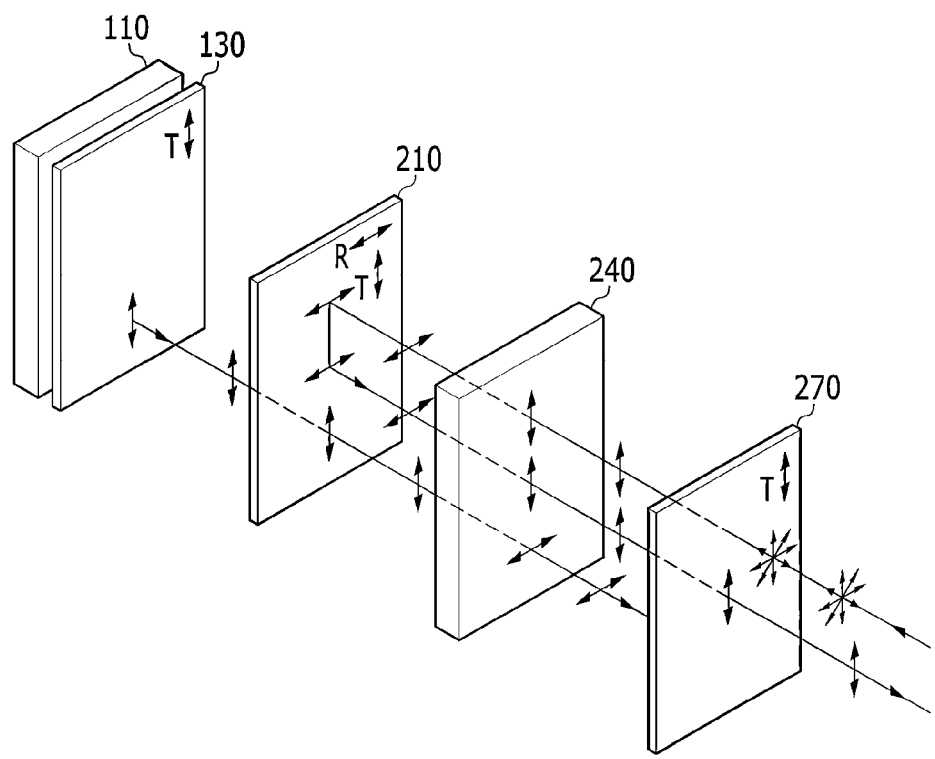
Figure 3C:
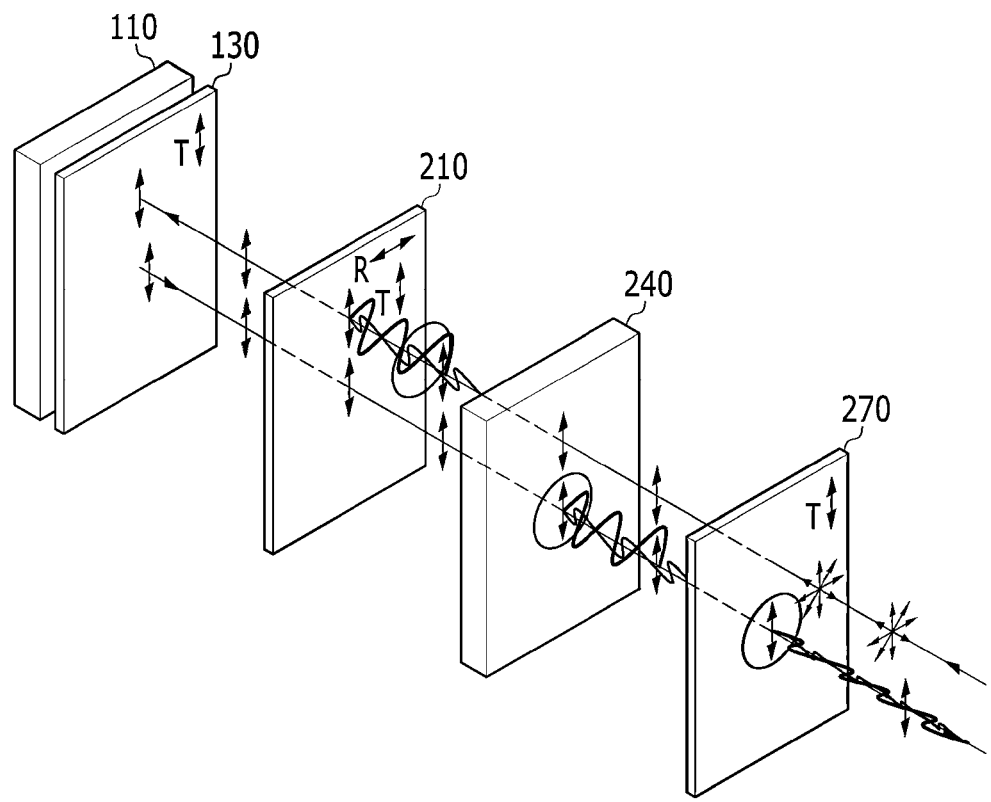

The embodiment in FIGS. 3A-3C is similar to the embodiment shown in FIGS. 2A-2C, in that the transmissive axes of the first polarizer 130 and the reflective polarizer 210 are parallel to each other, and the transmissive and reflection axes of the reflective polarizer 210 are perpendicular to each other.

However, unlike the embodiment shown in FIGS. 2A-2C, the transmissive axes of the absorptive polarizer 270 and the reflective polarizer 210 in FIGS. 3A-3C are parallel to each other.

First, FIG. 3A illustrates a transmission path of light when a voltage is applied (to the liquid crystal of the ECB mode).

When incident light from the outside arrives at the display panel, only light having a same polarization axis as the transmissive axis of the absorptive polarizer 270 passes through the absorptive polarizer 270, while the remainder of the light (that does not have the same polarization axis as the transmissive axis of the absorptive polarizer 270) is absorbed by the absorptive polarizer 270.

Referring to FIG. 3A, in some embodiments, only light having the transmissive axis in a vertical direction is transmitted.

When the liquid crystal of the ECB mode is applied with a voltage, light polarized by the absorptive polarizer 270 in one direction is transmitted through the liquid crystal of the ECB mode while maintaining the same polarization axis.

In some embodiments, light is transmitted through the liquid crystal of the ECB mode while maintaining the polarization axis in the vertical direction.

Light having the vertical polarization axis has a polarization axis parallel to the transmissive axis of the reflective polarizer 210 such that the light is completely transmitted therethrough.

The light transmission principles described above apply equally to the light emitting out of the display panel 100.

In some embodiments, the light transmitted through the display panel 100 and the first polarizing plate 130 has a polarization axis parallel to the transmissive axis of the first polarizer 130.

The polarization axes of the first polarizer 130 and the reflective polarizer 270 are parallel to each other such that the light transmitted through the first polarizer 130 also passes through the reflective polarizer 270.

When a voltage is applied to the liquid crystal of the ECB mode, light transmits through the liquid crystal of the ECB mode without changing its polarization axis.

Accordingly, light having the vertical polarization axis maintains its polarization axis in the vertical direction.

In some embodiments, the transmissive axes of the reflective polarizer 210 and the absorptive polarizer 270 are parallel to each other such that light having the vertical polarization axis transmits through the absorptive polarizer 270 parallel with the absorptive polarizer 270.

Accordingly, when a voltage is applied to the phase delay panel 200, light emitting out of the display panel may display an image without additional phase delay.

Next, FIG. 3B illustrates a case in which no voltage is applied to the liquid crystal of the ECB mode.

Incident light from the outside has polarization axes in all directions, but only light having its polarization axis in one direction passes through the absorptive polarizer 270 while the remainder of the light (having polarization axes in other directions) is absorbed by the absorptive polarizer 270.

In some embodiments, light is transmitted in a vertical direction through the absorptive polarizer 270.

When no voltage is applied to the liquid crystal of the ECB mode, light having a predetermined polarization axis transmits through the liquid crystal of the ECB mode such that the light is rotated by 90 degrees with respect to the current polarization axis.

That is, after being rotated by 90 degrees, the light is transmitted in the horizontal direction.

In some embodiments, the polarization axes of the reflective polarizer 210 and the absorptive polarizer 270 are parallel to each other, and the transmissive and reflection axes of the reflective polarizer 210 are perpendicular to each other.

Accordingly, in some embodiments, the transmissive and reflection axis of the reflective polarizer 210 lie in the vertical and horizontal directions, respectively. In those embodiments, light having the horizontal polarization axis is completely reflected because its polarization axis is parallel to the reflective axis.

After light is being reflected from the reflective polarizer 210, the vibrating axis of the reflected light is rotated by 180 degrees. However, the linearly polarized light is unaffected by the 180 degree rotation, and still maintains its vibrating axis even after the 180 degree rotation.

The transmittance property described above applies equally to the light that is reflected from the reflective polarizer 210 and emitted to the outside.

According to the inventive concept, the phase delay panel 200 including the liquid crystal of the ECB mode operates as a mirror when no voltage is applied, and displays an image when a voltage is applied.

The embodiment in FIGS. 3A-3C operates similarly to the embodiment shown in FIGS. 2A-2C. For example, when the liquid crystal in FIGS. 3A-3C is operated in the ECB mode, a predetermined voltage is applied between the lower and upper electrodes 230 and 250, so as to generate an electric field over the liquid crystal layer 3.

Particularly, the electric field may be adjusted to a predetermined voltage V so as to control the rotation and rotation degree of polarized light that is incident on the phase delay panel 200.

When the electric field applied to the liquid crystal molecules 31 is changed by varying the voltage applied to the liquid crystal layer 3, the alignment state of the liquid crystal molecules 31 is changed by the varying electric field.

As shown in FIG. 3C, depending on the variations in the alignment state, the refractive properties of the liquid crystal layer 3 are affected such that light having different wavelengths is converted to oval polarized lights each having a different polarization state.

The oval polarized lights are partially reflected from the reflective polarizer 210 and are transmitted through the liquid crystal layer 3 a second time.

In some embodiments, light passing through the liquid crystal layer 3 is converted to the oval polarized lights by refraction such that light of different wavelengths each having different intensities can be used to implement predetermined colors.

In some embodiments, the light transmitted through the absorptive polarizer 270 is limited to one polarization direction, but the wavelengths of light that is transmitted through the absorptive polarizer 270 may be sufficiently diverse to display a white color.

However, the light transmitted through the liquid crystal layer 3 may have different phase values depending on its wavelengths. As a result, when the light is reflected from the reflective polarizer 210 to be transmitted through an upper portion of the absorptive polarizer 270, light of a fixed range of wavelengths is generally transmitted while light of other wavelengths is absorbed.

Accordingly, specific colors may be displayed using the above-described embodiments.

Figure 4A:
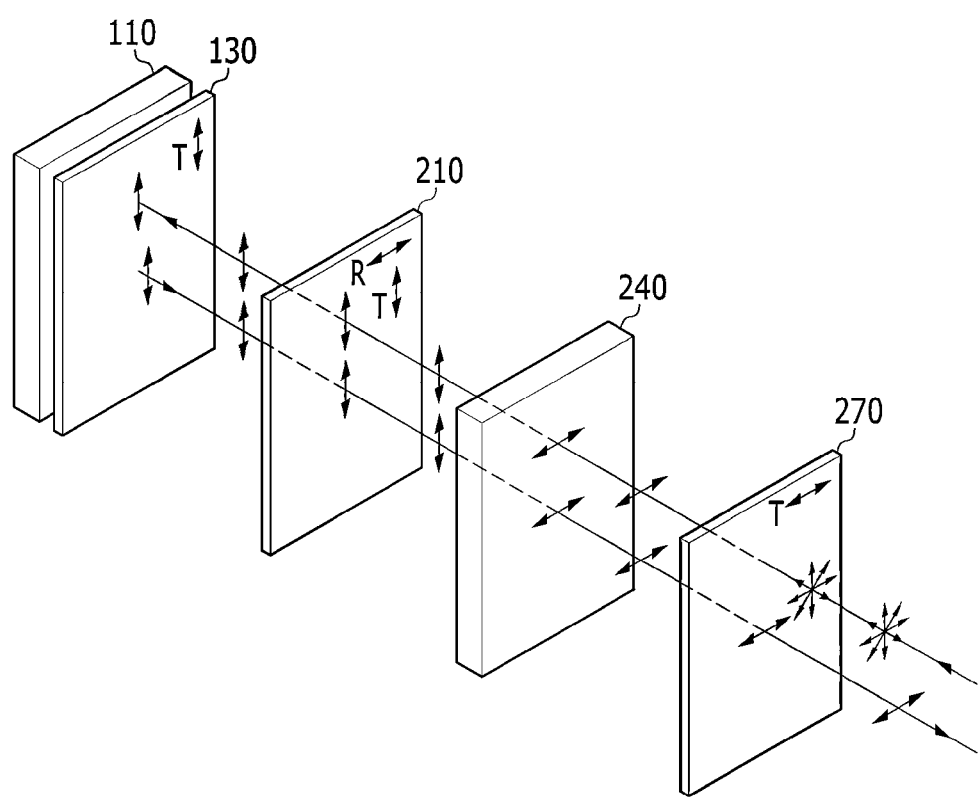
FIG. 4A to FIG. 4C are schematic views showing a liquid crystal of a VA mode in a phase delay panel (operated in a mirror mode to reflect predetermined colors) according to an exemplary embodiment of the inventive concept.
Figure 4B:
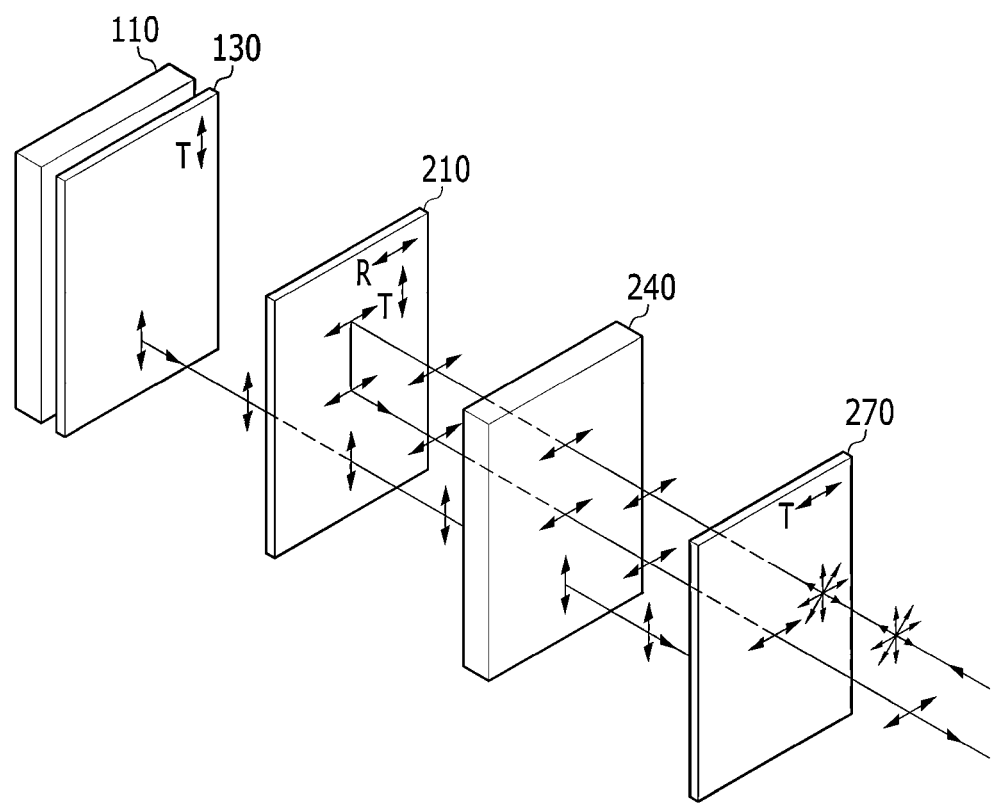
Figure 4C:
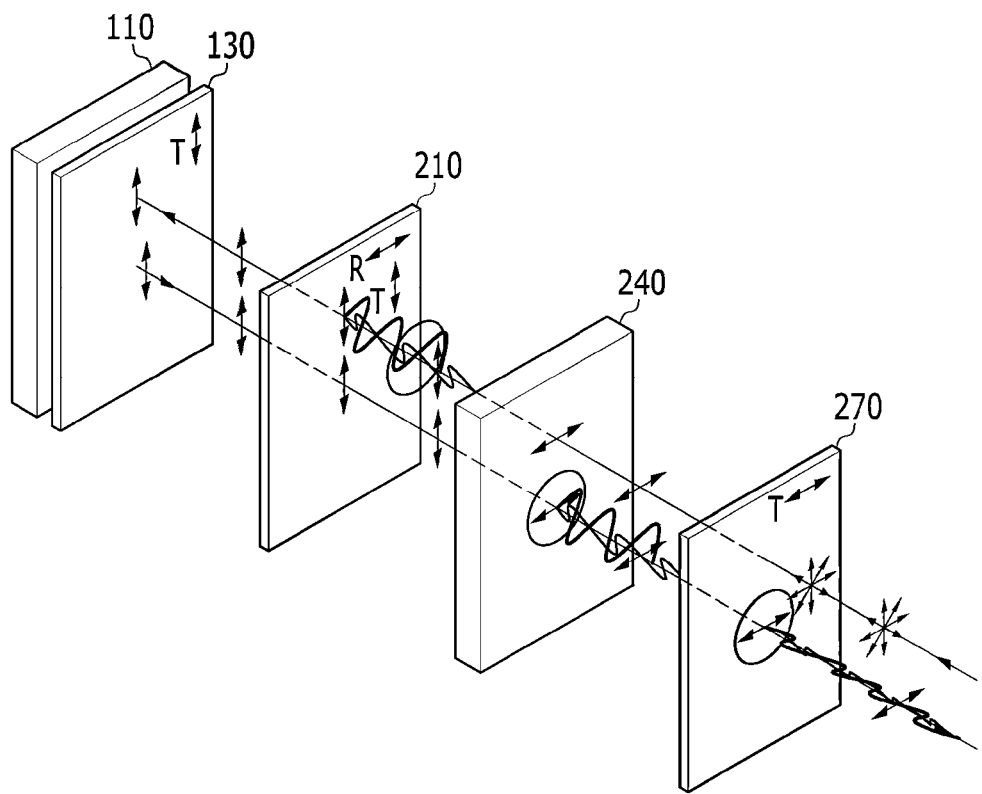

Referring to FIG. 4A to FIG. 4C, the liquid crystals are in the VA mode, and the transmissive axes of the first polarizer 130 and the reflective polarizer 210 are parallel to each other while the transmissive axes of the reflective polarizer 210 and the absorptive polarizer 270 are perpendicular to each other.

Although a liquid crystal of the VA mode has been described in FIG. 4A to 4C, the inventive concept is not limited thereto. For example, in some other embodiments, the liquid crystal may be in an OCB (optically compensated bend) mode or a PLS (polarized light source) mode. It should be appreciated that the light transmission can include any of the above-described modes.

FIG. 4A illustrates how light is transmitted when a voltage is applied to a liquid crystal of the VA mode. FIG. 4B illustrates how light is transmitted when no voltage is applied to a liquid crystal of the VA mode.

First, for incident light arriving from the outside, only light having the same polarization axis as the transmissive axis of the absorptive polarizer 270 passes through the absorptive polarizer 270, while the remainder of the light (that does not have the same polarization axis as the transmissive axis of the absorptive polarizer 270) is absorbed by the absorptive polarizer 270.

Referring to FIG. 4A, in some embodiments, only the light in the horizontal direction is transmitted through the absorptive polarizer 270.

When a voltage is applied to the liquid crystal of the VA mode, the polarization axis of the light polarized by the absorptive polarizer 270 in one direction is transmitted through the liquid crystal of the VA mode such that the light is rotated by 90 degrees.

The light with its polarization axis rotated by 90 degrees has a vertical polarization axis.

The light having the vertical polarization axis has a polarization axis parallel to the transmissive axis of the reflective polarizer 210 such that the light is completely transmitted therethrough.

The light transmission principles described above apply equally to the light emitting out of the display panel 100.

The light polarized by the display panel 100 and the first polarizer 130 has a polarization axis parallel to the transmissive axis of the first polarizer 130.

The transmissive axes of the first polarizer 130 and the reflective polarizer 210 are parallel to each other such that the light transmitted through the first polarizer 130 also passes through the reflective polarizer 210.

When a voltage is applied to the liquid crystal of the VA mode, light passes through the liquid crystal of the VA mode such that its polarization axis is rotated by 90 degrees.

Thus, the incident light having the vertical polarization axis is emitted to the outside such that the incident light (emitted to the outside) has the horizontal polarization axis.

The transmissive axes of the reflective polarizer 210 and the absorptive polarizer 270 are perpendicular to each other such that the light having the polarization axis parallel to the transmissive axis of the absorptive polarizer passes through the absorptive polarizer 270.

Thus, the light emitting out of the display panel 100 displays the image without having additional phase delay when a voltage is applied to the phase delay panel 200.

Next, FIG. 4B illustrates a case in which a voltage is applied to the liquid crystal of the VA mode.

Incident light arriving from the outside has polarization axes in all directions, but only light with its polarization axis in one direction passes through the absorptive polarizer 270 while the remainder of the light (having polarization axes in other directions) is absorbed by the absorptive polarizer 270.

In some embodiments, the light in the horizontal polarization direction is transmitted through the absorptive polarizer 270.

When a voltage is not applied to the liquid crystal of the VA mode, light having a predetermined polarization axis passes through the liquid crystal of the VA mode such that the light maintains the current horizontal polarization axis.

In some embodiments, the transmissive axes of the reflective polarizer 210 and the absorptive polarizer 270 are parallel to each other, and the transmissive and reflective axes of the reflective polarizer 210 are perpendicular to each other.

Thus, the transmissive axis of the reflective polarizer 210 is in the vertical direction and the reflective axis of the reflective polarizer 210 is in the horizontal direction. Since the light having the horizontal polarization axes is parallel to the reflective axis of the reflective polarizer 210, the light having the horizontal polarization axes is therefore completely reflected.

After the light is reflected from the reflective polarizer 210, the vibrating axis of the reflected light is rotated by 180 degrees. However, the linearly polarized light is unaffected by the 180 degree rotation, and still maintains its vibrating axis even after the 180 degree rotation.

The light transmission principles described above apply equally to the light that is reflected from the reflective polarizer 210 and emitted to the outside.

According to the inventive concept, the phase delay panel 200 including the liquid crystal of the VA mode operates as a mirror when no voltage is applied, and operates as a display device when a voltage is applied.

Meanwhile, referring to FIG. 4C, even though the liquid crystal is operated in the VA mode as illustrated in FIG. 2, the electric field may be adjusted to a predetermined voltage V, so as to control the rotation and rotation degree of polarized light that is incident upon the phase delay panel 200.

According to an exemplary embodiment of the inventive concept, when the voltage applied between the upper and lower electrodes 250 and 230 is changed to vary the electric field applied to the liquid crystal molecules 31, the alignment state of the liquid crystal molecules 31 is changed by the varying electric field.

As shown in FIG. 4C, depending on the variations in the alignment state, refraction of light in the liquid crystal layer 3 is affected such that light having different wavelengths is converted to oval polarized lights each having a different polarization state.

The oval polarized lights are partially reflected by the reflective polarizer 210 and are transmitted through the liquid crystal layer 3 a second time.

In some embodiments, the light passing through the liquid crystal layer 3 is converted to the oval polarized lights by refraction such that light of different wavelengths each having different intensities can be used to implement predetermined colors.

In some embodiments, the light transmitted through the absorptive polarizer 270 is limited to one polarization direction, but the wavelengths of the light that is transmitted through the absorptive polarizer 270 may be sufficiently diverse to display a white color.

In some embodiments, the light transmitted through the liquid crystal layer 3 may have different phase values depending on its wavelengths. As a result, when the light is reflected from the reflective polarizer 210 to be transmitted through an upper portion of the absorptive polarizer 270, light of a fixed range of wavelengths is generally transmitted while the light of other wavelengths is absorbed.

Specific colors may be displayed according to the above-described embodiments.

Next, a lower electrode or upper electrode according to another exemplary embodiment will be described with reference to FIGS. 5 to 11.

FIGS. 5 to 11 are partial cross-sectional views of a phase delay panel according to another exemplary embodiment of the inventive concept.

Figure 5:
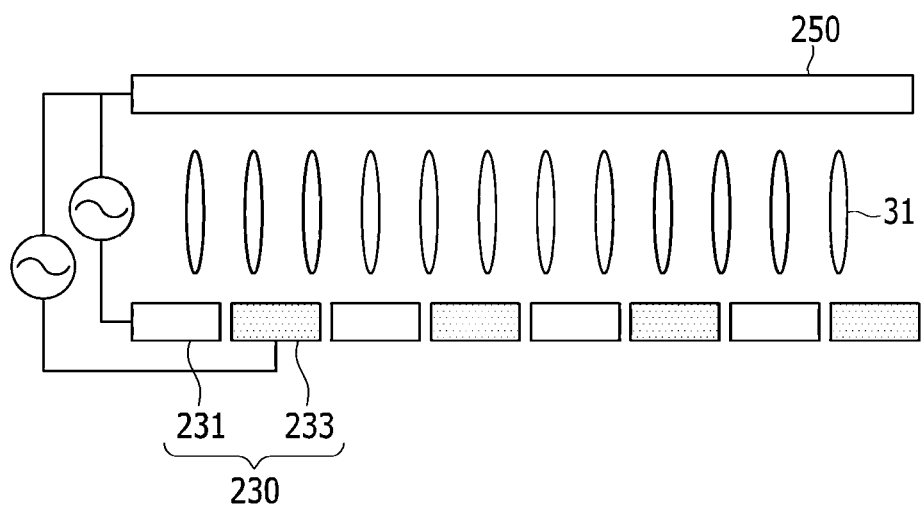
FIGS. 5 to 11 are cross-sectional views of a phase delay panel according to another exemplary embodiment of the inventive concept.

Referring to FIG. 5, a lower electrode 230 may include a plurality of sub-electrodes 231 and 233 formed as linear members. Some of the sub-electrodes 231 or 233 may be driven (or not driven) to implement a reflective mode in which the mirror can be used.

It should be noted that the plurality of the sub-electrodes 231 and 233 are not limited to a fixed shape. For example, in some embodiments, the plurality of sub-electrodes 231 and 233 may be combined together to cover the entire display panel 100. In other embodiments, the plurality of sub-electrodes 231 and 233 may partially overlap each other.

In some embodiments, the plurality of sub-electrodes 231 and 233 may be stripe-shaped linear members, and linear members having a fixed width may be disposed parallel to each other.

In some embodiments, a predetermined voltage may be applied to each linear member so as to generate an electric field in conjunction with an upper electrode 250.

The predetermined voltage may have a plurality of values, and a plurality of voltages may be applied to the plurality of sub-electrodes so as to divide the sub-electrodes into a plurality of regions.

Referring to FIG. 5 as an example, a first voltage may be applied to the sub-electrodes 231, while a second voltage may be applied to the sub-electrodes 233.

Thus, an electric field is generated in a first region (comprising the upper electrodes 250, and the sub-electrodes 231 to which the first voltage is applied)), and an electric field is generated in a second region (comprising the upper electrodes 250, and the sub-electrodes 233 to which the second voltage is applied).

In the above embodiments, two independent voltages are applied so as to divide the sub-electrodes into two sub-regions. Nevertheless, the inventive concept is not limited thereto, and it should be noted that a plurality of independent voltages may be applied so as to divide the sub-electrodes into a plurality of sub-regions.

In some embodiments, the first region (applied with the first voltage) may be operated in a mirror mode to display predetermined colors, while the second region (applied with the second voltage) may be operated in the mirror mode to display colors other than the predetermined colors.

In some alternative embodiments, the first or second region may be operated in the transmissive mode instead of the mirror mode.

An image may be displayed if one region is operated in the transmissive mode and the display panel displays the image at the same time. Conversely, a black background may be displayed if no voltage is applied to the display panel and the display panel displays nothing at the same time.

Thus, a partial mirror mode may be implemented by partially applying the voltage through the plurality of patterned sub-electrodes, and a user may recognize a patterned shape in the mirror mode that displays the predetermined colors (by changing the voltage applied when implementing the mirror mode).

Figure 6:
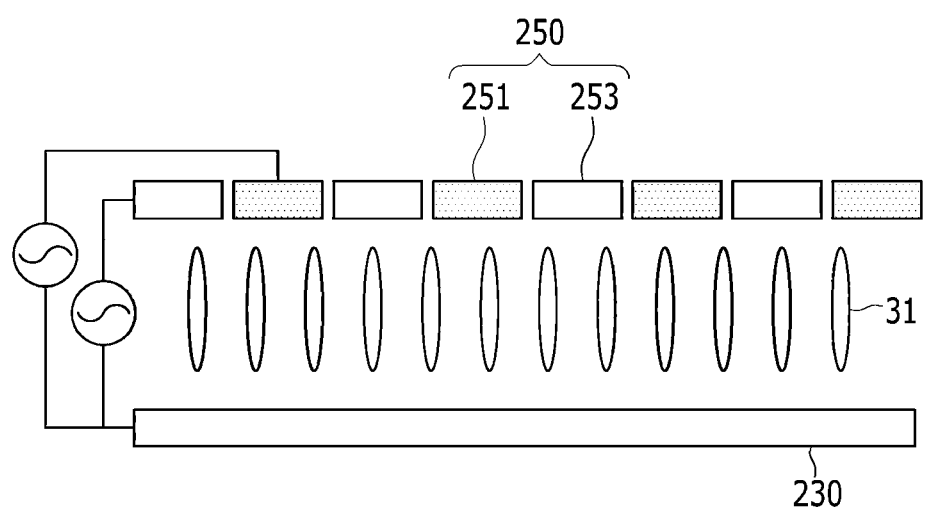

Referring to FIG. 6, the upper electrode 250 may include a plurality of sub-electrodes.

In some embodiments, the upper electrode 250 has a symmetric shape (e.g., as shown in FIG. 5), in which the lower electrode 230 including the plurality of sub-electrodes is provided.

It should be noted that a plurality of sub-electrodes 251 and 253 forming the upper electrode 250 are not limited to a fixed shape. For example, in some embodiments, the plurality of sub-electrodes 251 and 253 may be combined together to cover the entire display panel 100. In other embodiments, the plurality of sub-electrodes 251 and 253 may partially overlap each other.

In some embodiments, the plurality of sub-electrodes 251 and 253 may be stripe-shaped linear members, and the linear members having a fixed width may be disposed parallel to each other.

In some embodiments, a predetermined voltage is applied to each linear member so as to generate an electric field in conjunction with the lower electrode 230.

The predetermined voltage applied to the upper electrode 250 may have a plurality of values, and a plurality of voltages may be applied to the plurality of sub-electrodes so as to divide the sub-electrodes into a plurality of regions.

In some embodiments, a first voltage may be applied to the sub-electrodes 251, while a second voltage may be applied to the sub-electrodes 253.

Thus, an electric field is generated in a first region (comprising the lower electrode 230, and the sub-electrodes 251 to which the first voltage is applied)), and an electric field is generated in a second region (comprising the lower electrode 230, and the sub-electrodes 253 to which the second voltage is applied).

In the above embodiments, two independent voltages are applied so as to divide the sub-electrodes into two sub-regions. Nevertheless, the inventive concept is not limited thereto, and it should be noted that a plurality of independent voltages may be applied so as to divide the sub-electrodes into a plurality of sub-regions.

In some embodiments, the first region (applied with the first voltage) may be operated in a mirror mode to display predetermined colors, while the second region (applied with the second voltage) may be operated in the mirror mode to display colors other than the predetermined colors.

In some alternative embodiments, the first or second region may be operated in the transmissive mode instead of the mirror mode. An image may be displayed if one region is operated in the transmissive mode and the display panel displays the image at the same time. Conversely, no image may be displayed if no voltage is applied to the display panel.

Thus, a partial mirror mode may be implemented by partially applying the voltage through the plurality of patterned sub-electrodes, and a user may recognize a patterned shape in the mirror mode that displays the predetermined colors (by changing the voltage applied when implementing the mirror mode).

Figure 7:
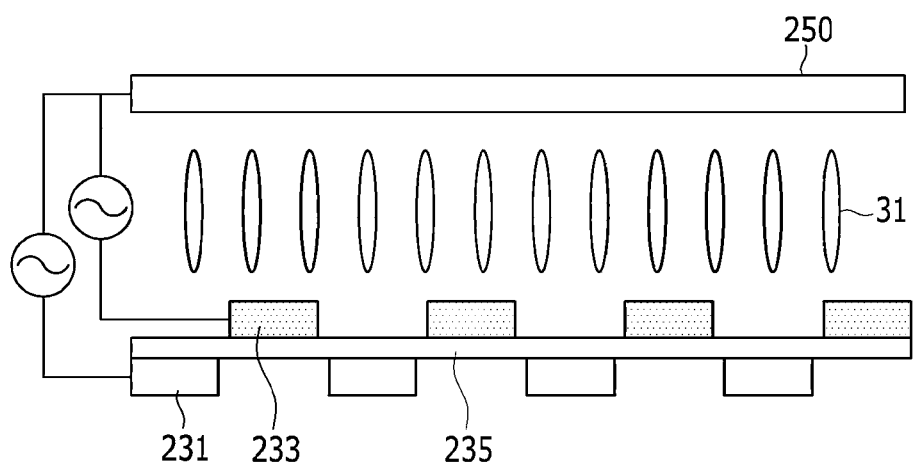

Next, as shown in FIG. 7, the lower electrode 230 may include the plurality of first sub-electrodes 231 spaced apart from each other by a fixed interval, an insulation layer 235 disposed on the plurality of first sub-electrodes 231, and the plurality of second sub-electrodes 233 spaced apart from each other and disposed crossing the plurality of first sub-electrodes 231.

Referring to FIG. 7, the lower electrode 230 includes the patterned first sub-electrodes 231 and the patterned second sub-electrodes 233.

The patterned first and second sub-electrodes 231 and 233 are separately layered such that the insulation layer 235 is disposed between the first and second sub-electrodes 231 and 233.

The first and second sub-electrodes 231 and 233 may be patterned as linear members, and may have a long rod shape (e.g., as shown in FIG. 7).

The plurality of first and second sub-electrodes 231 and 233 may be spaced apart from each other by a fixed distance, and the first and second sub-electrodes 231 and 233 may be alternately disposed covering the entire region on the plane.

In addition, when the first and second sub-electrodes 231 and 233 are disposed in the configuration shown in FIG. 7, the first and second sub-electrodes 231 and 233 do not overlap each other (so as to reduce the number of electrodes that may be unnecessarily wasted).

The predetermined voltage may have a plurality of values, and a plurality of voltages may be applied to the plurality of sub-electrodes so as to divide the sub-electrodes into a plurality of regions according to the voltage differences.

In some embodiments, referring to FIG. 7, a first voltage may be applied to the sub-electrodes 231, while a second voltage may be applied to the sub-electrodes 233.

Thus, an electric field is generated in a first region (comprising the upper electrode 250, and the sub-electrodes 231 to which the first voltage is applied)), and an electric field is generated in a second region (comprising the upper electrode 250, and the sub-electrodes 233 to which the second voltage is applied).

In the above embodiments, two independent voltages are applied so as to divide the sub-electrodes into two sub-regions. Nevertheless, the inventive concept is not limited thereto, and it should be noted that a plurality of independent voltages may be applied so as to divide the sub-electrodes into a plurality of sub-regions.

Since the alignment of the liquid crystal molecules is dependent upon the voltage differences, the first region (applied with the first voltage) may be operated in the mirror mode to display predetermined colors, while the second region (applied with the second voltage) may be operated in the mirror mode to display colors other than the predetermined colors.

In some alternative embodiments, one of the first and second regions may be operated in the transmissive mode instead of the mirror mode. An image may be displayed if one region is operated in the transmissive mode and the display panel displays the image at the same time. Conversely, no image may be displayed if no voltage is applied to the display panel.

Thus, a partial mirror mode may be implemented by partially applying (or not applying) a voltage through the plurality of patterned sub-electrodes, and a user may recognize a patterned shape in the mirror mode that displays the predetermined colors (by changing the voltage applied when implementing the mirror mode on the entire plane).

Figure 8:
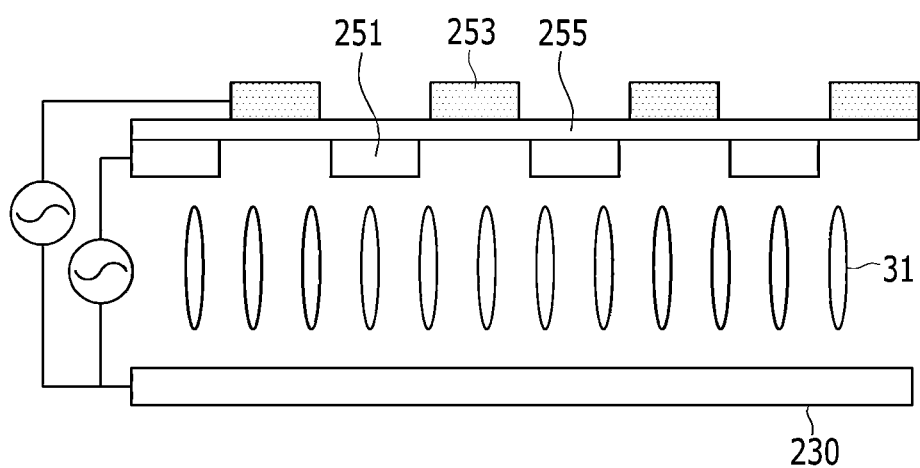

Next, as shown in FIG. 8, the upper electrode 250 may include a plurality of first sub-electrodes 251 spaced apart from each other by a fixed interval, an insulation layer 255 disposed on the plurality of first sub-electrodes 251, and a plurality of second sub-electrodes 253 that are alternately arranged with the plurality of first sub-electrodes 251 and spaced apart from each other.

The first and second sub-electrodes 251 and 253 may be patterned as linear members, and may have a long rod shape (e.g., as shown in FIG. 8).

The plurality of first and second sub-electrodes 251 and 253 may be spaced apart from each other by a fixed interval, and the first and second sub-electrodes 251 and 253 may be alternately disposed covering the entire region on the plane.

In some embodiments, when the first and second sub-electrodes 251 and 253 are disposed in the configuration shown in FIG. 8, the first and second sub-electrodes 251 and 253 do not overlap each other (so as to reduce the number of electrodes that may be unnecessarily wasted).

The predetermined voltage may have a plurality of values, and a plurality of voltages may be applied to the plurality of sub-electrodes so as to divide the sub-electrodes into a plurality of regions according to voltage differences.

In some embodiments, a first voltage may be applied to the sub-electrodes 251, while a second voltage may be applied to the sub-electrodes 253.

Thus, an electric field is generated in a first region (comprising the lower electrode 230, and the sub-electrodes 251 to which the first voltage is applied), and an electric field is generated in a second region (comprising the lower electrode 230, and the sub-electrodes 253 to which the second voltage is applied).

In the above embodiments, two independent voltages are applied so as to divide the sub-electrodes into two sub-regions. Nevertheless, the inventive concept is not limited thereto, and it should be noted that a plurality of independent voltages may be applied to divide the sub-electrodes into a plurality of sub-regions.

Since the alignment of the liquid crystal molecules in each region is dependent upon the voltage differences, the first region (applied with the first voltage) may be operated in a mirror mode to display predetermined colors, while the second region (applied with the second voltage) may be operated in the mirror mode to display colors other than the predetermined colors.

In some alternative embodiments, the first or second region may be operated in the transmissive mode instead of the mirror mode. An image may be displayed if one region is operated in the transmissive mode and the display panel displays the image at the same time. Conversely, no image may be displayed if no voltage is applied to the display panel.

Thus, a partial mirror mode may be implemented by partially applying (or not applying) the voltage through the plurality of patterned sub-electrodes, and a user may recognize a patterned shape in the mirror mode whereby the predetermined colors are displayed by changing the voltage applied for each region on the entire plane.

Figure 9:
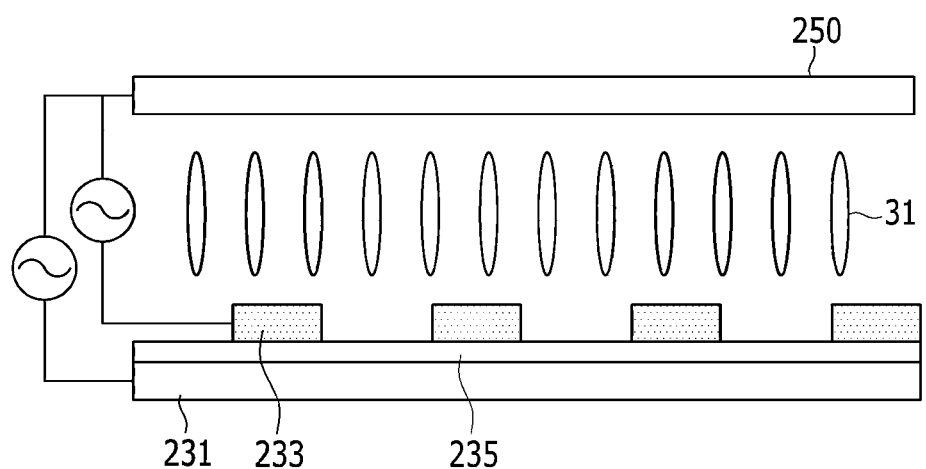

Next, as shown in FIG. 9, the lower electrode 230 may include a first sub-electrode 231, an insulation layer 235 disposed on the first sub-electrode 231, and a second sub-electrode 233 disposed on the insulation layer 235. One of the first and second sub-electrodes 231 and 233 may have a planar shape while the other may include a plurality of linear shapes.

That is, the first sub-electrode 231 disposed at a lower side may be layered having a planar shape, while the second sub-electrode 233 may be formed as linear members having a long rod shape (e.g., as shown in FIG. 7 or FIG. 8).

In the exemplary embodiment illustrated in FIG. 9, a voltage may (or may not) be applied to the plane-shaped first sub-electrode 231 disposed on the lower side to drive it in the transmissive or the entire mirror mode. In some other embodiments, a voltage may (or may not) be applied to the linear second sub-electrode 233 disposed on the upper side to drive it in a partially patterned mirror mode.

Various colors may be exhibited by applying a plurality of voltages to the plurality of second sub-electrodes 233.

Figure 10:
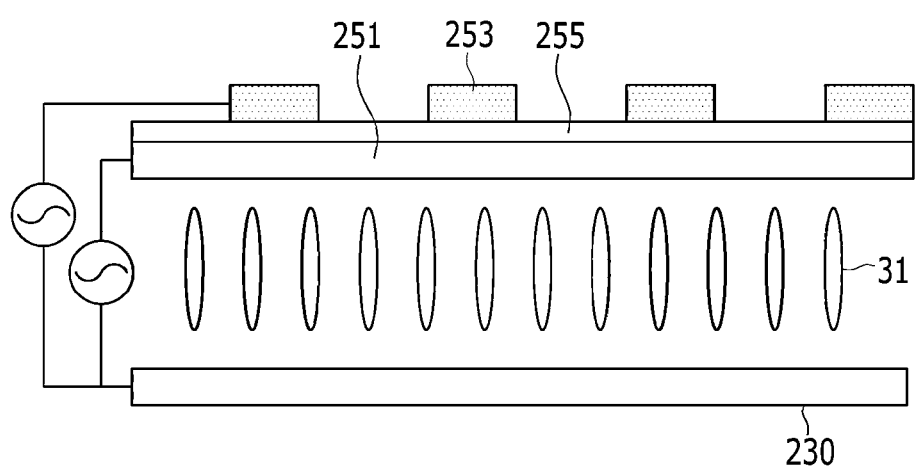

Next, as shown in FIG. 10, an upper electrode 250 may include a first sub-electrode 251, an insulation layer 255 disposed on the first sub-electrode 251, and a second sub-electrode 253 disposed on the insulation layer 255. One of the first and second sub-electrodes 251 and 255 may have a planar shape while the other may include a plurality of linear shapes.

That is, the first sub-electrode 251 disposed at the upper side may be layered to have a planar shape, while the second sub-electrode 253 may have a long bar shape (such as stripe-shaped members, for example, as shown in FIG. 7 or FIG. 8).

In the exemplary embodiment illustrated in FIG. 10, a voltage may (or may not) be applied to the plane-shaped first sub-electrode 251 disposed on the lower side to drive it in the transmissive or the entire mirror mode. In some other embodiments, a voltage may (or may not) be applied to the linear second sub-electrode 253 to drive it in a partially patterned mirror mode.

Various colors may be exhibited by applying a plurality of voltages to the plurality of second sub-electrodes 253.

Figure 11:
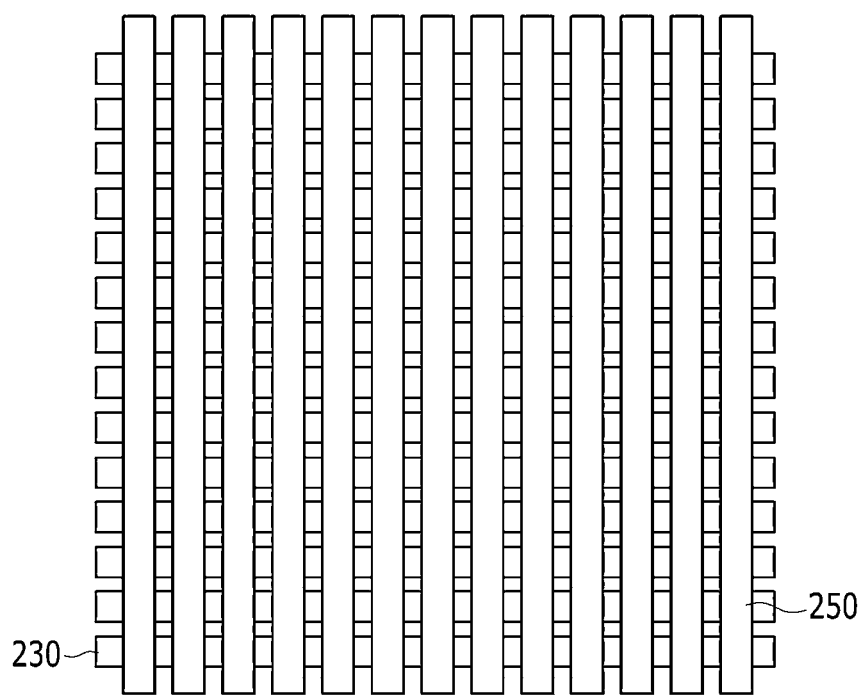

Next, as shown in FIG. 11, the lower and upper electrodes 230 and 250 may include a plurality of linear members.

The lower and upper electrodes 230 and 250 may both include a plurality of sub-electrodes, and the plurality of sub-electrodes may be stripe-shaped lines (e.g., as shown in FIG. 11). The lower and upper electrodes 230 and 250 (formed as long rod-shaped linear members) are disposed perpendicular to each other. That is, when the upper electrodes 250 are arranged in a vertical direction, the lower electrodes 230 are arranged in a horizontal direction (or vice versa).

Thus, when the electrodes are formed in a passive matrix form as described above, various patterned mirror modes with various shapes can be implemented.

Specifically, the mirror mode may be implemented by applying (or not applying) the voltage to a fixed region, while the transmissive mode may be implemented by applying (or not applying) the voltage to the remaining region outside of the fixed region.

Next, the phase delay panel 200 according to different exemplary embodiments of the inventive concept will be described with reference to FIGS. 12A to 14F. Specifically, FIGS. 12A to 14F are experimental images illustrating the phase delay panel in various modes according to different exemplary embodiments of the inventive concept.

Figure 12A:
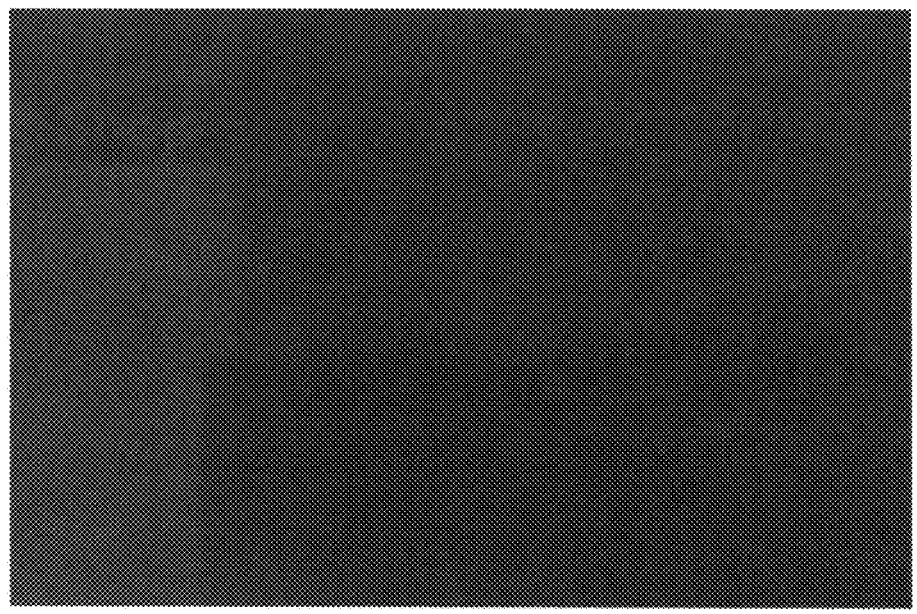
FIGS. 12A to 14F are experimental images illustrating a phase delay panel operated in various modes according to different exemplary embodiments of the inventive concept.
Figure 12B:
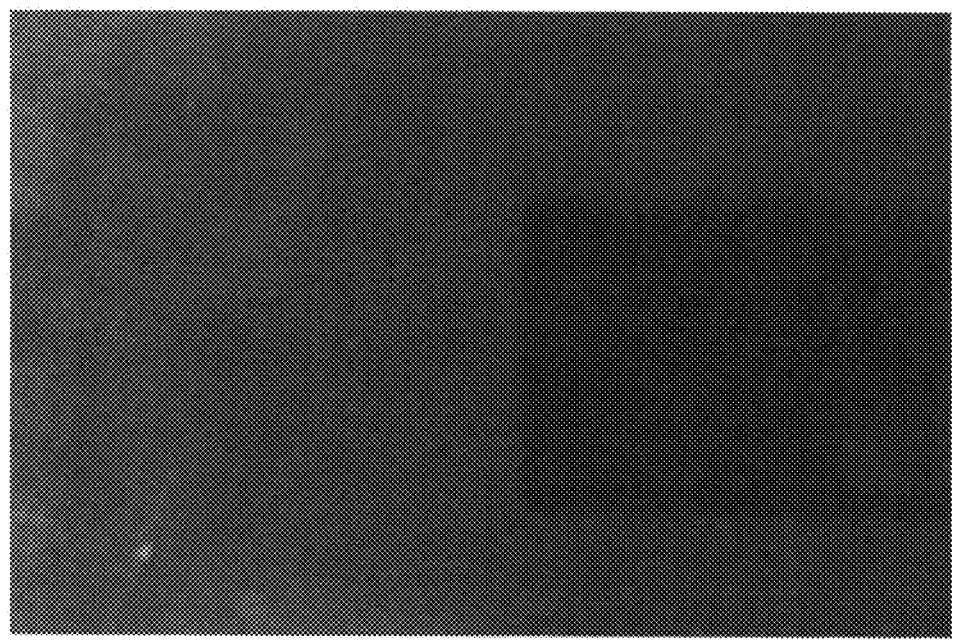
Figure 12C:
Figure 12D:
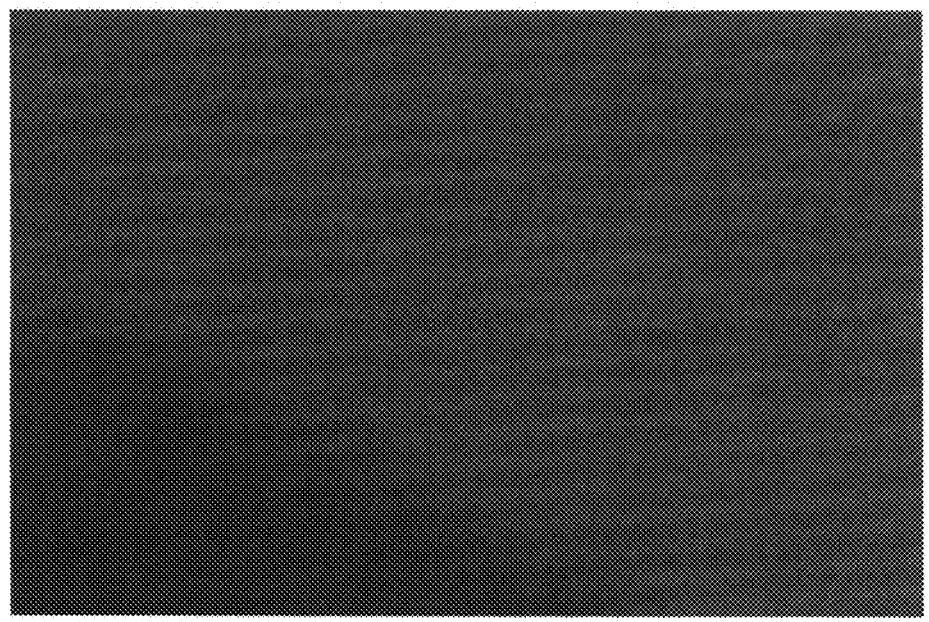

Referring to FIGS. 12A to 12D, FIG. 12A illustrates a case in which the light is transmitted through the phase delay panel and thus a printed material positioned thereunder is recognized. FIG. 12B illustrates a case in which the entire surface of the phase delay panel is in a reflective mode and thus an image of a camera is reflected. FIGS. 12C and 12D illustrate a case in which the electrodes (formed as stripe-shaped linear members) are partially operated in the reflective mode to display stripe-shaped patterns when the image is enlarged.

In contrast to the embodiments shown in FIGS. 12A to 12D, FIGS. 13A to 13D illustrate a case in which the reflective polarizer has a predetermined haze value.

Figure 13A:
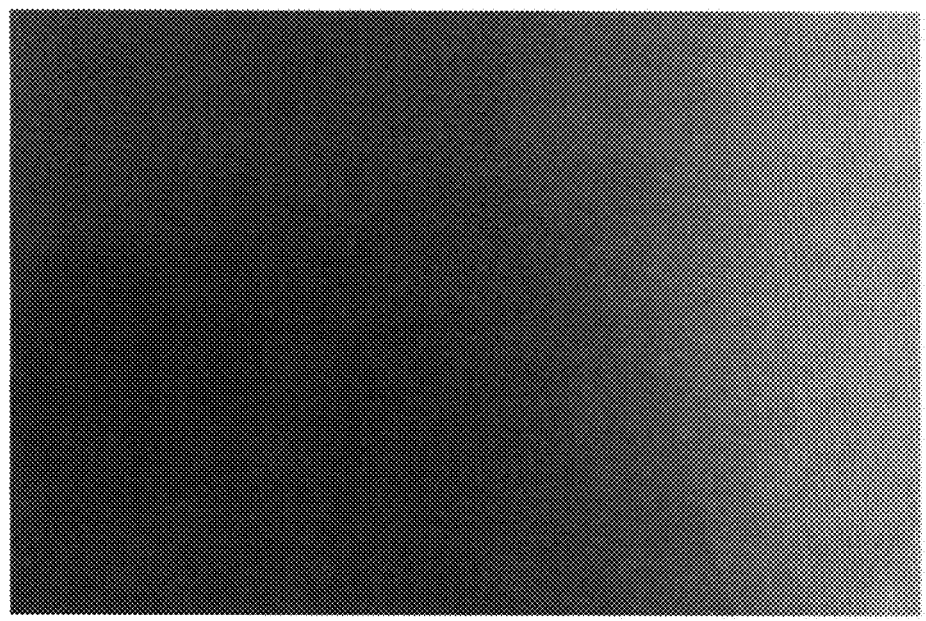

FIG. 13A illustrates a case in which a predetermined voltage is applied and predetermined colors are displayed when being operated in the reflective mode. FIG. 13A further illustrates a case in which an image is not clear in the reflective mode but nevertheless, vivid colors may be displayed by scattering when the polarizer has the predetermined haze value.

Figure 13B:
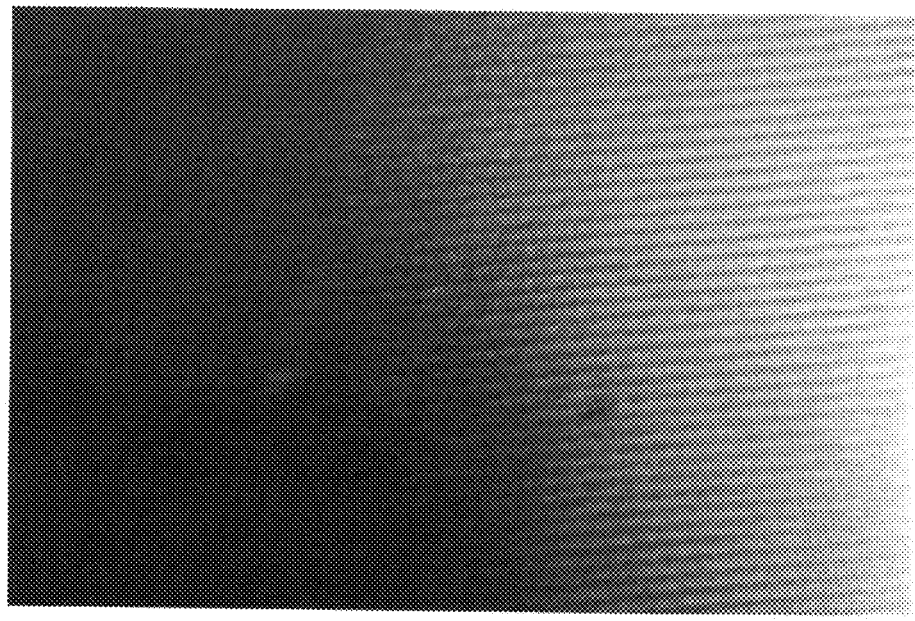

FIG. 13B illustrates a case in which a predetermined voltage is applied to be operated in the reflective mode and a fixed range of colors are displayed. As an example, stripe-shaped patterns are displayed by partially driving the linearly formed sub-electrodes.

Figure 13C:
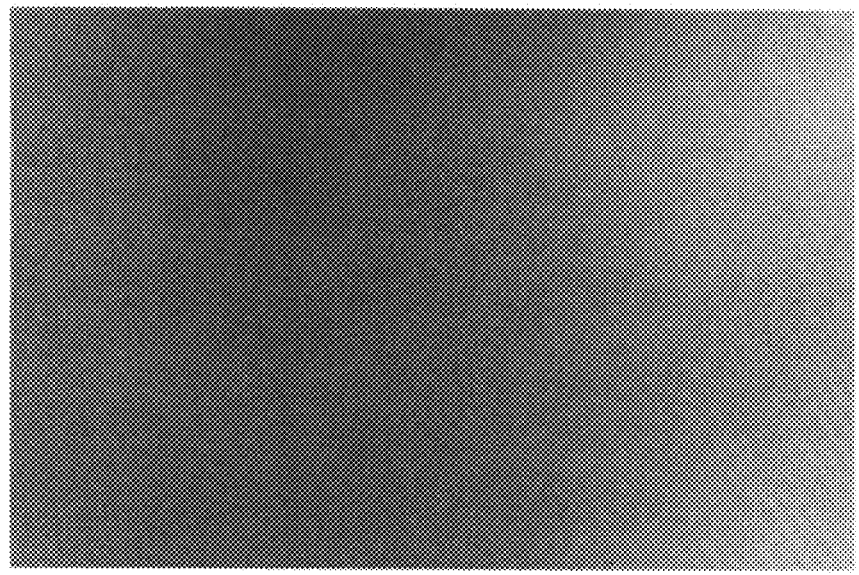
Figure 13D:

FIGS. 13C and 13D display colors that are different from those shown in FIGS. 13A and 13B. The different colors can be displayed based on the voltage changes applied to the phase delay panel. In the embodiment of FIGS. 13C and 13D, vivid colors can be displayed by utilizing a polarizer having a predetermined haze value.

Figure 14A:
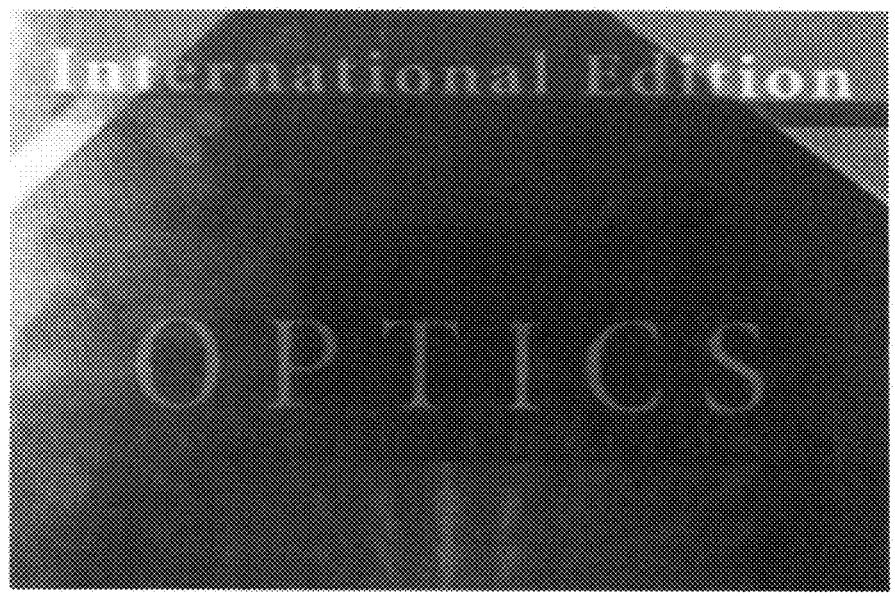
Figure 14B:
Figure 14C:
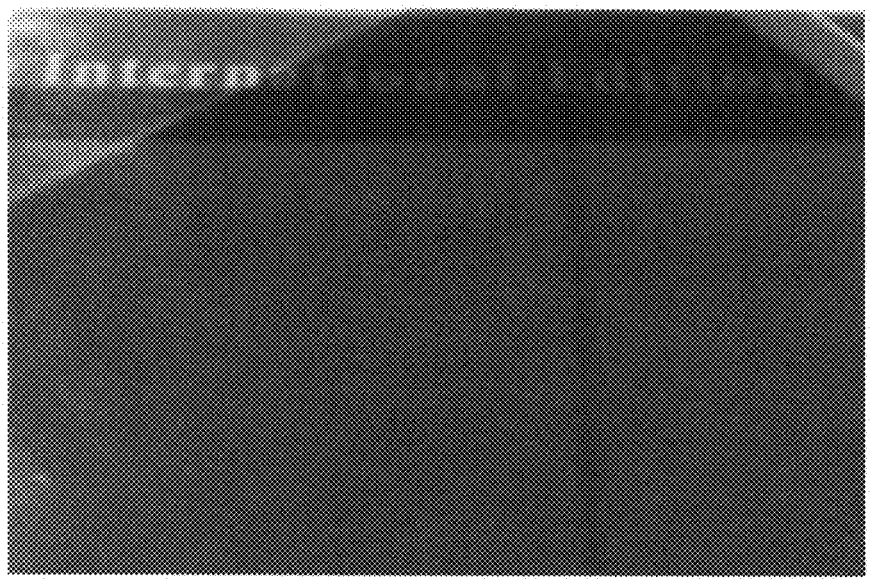
Figure 14D:
Figure 14E:
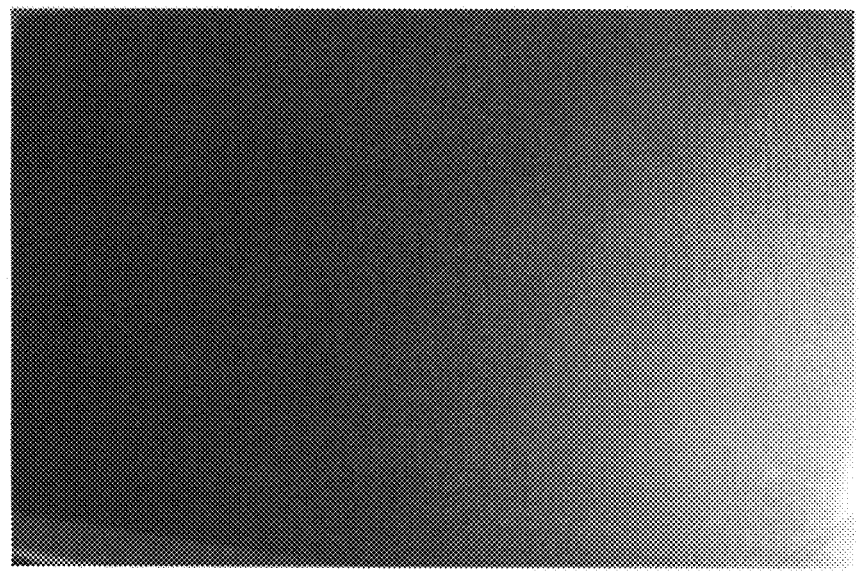
Figure 14F:
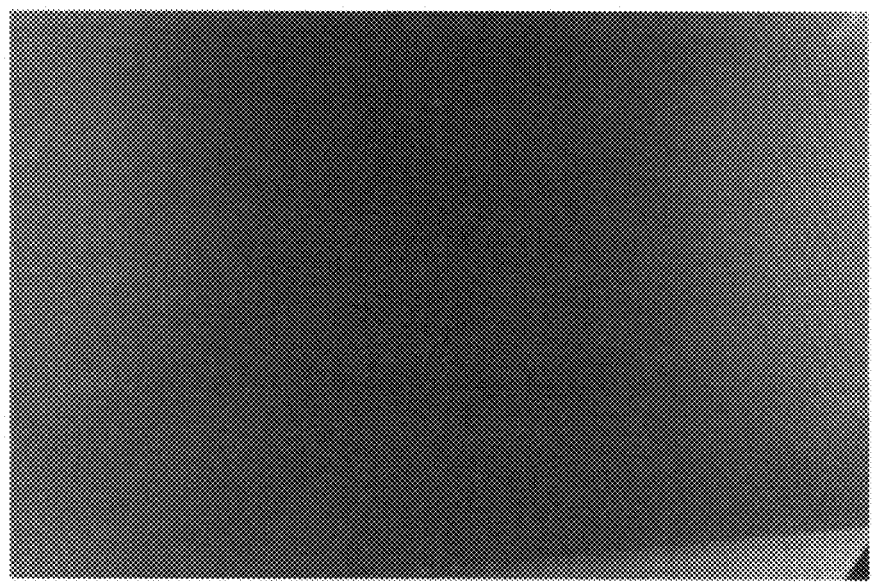

FIG. 14A to 14F illustrate images of an exemplary embodiment that is operated in the transmissive and reflective modes when a horizontal electric field is generated. Specifically, FIGS. 14A to 14C illustrate a case in which polarizers without haze are used, and FIGS. 14D to 14F illustrate a case in which polarizers with a predetermined haze value are used.

FIG. 14A illustrates a case in which a printed material positioned under the polarized conversion panel is viewed clearly when operated in the transmissive mode that applies the horizontal electric field. FIG. 14B illustrates a case in which an image of a photographing camera is displayed when operated in a reflective mode of the horizontal electric field. In addition, FIG. 14C illustrates a case in which a fixed range of colors are reflected when colors are implemented by applying predetermined voltages.

Meanwhile, when haze values are included, various colors (such as violet, yellow, or green) may be exhibited by applying different voltages (e.g., as shown in FIGS. 14D to 14F). Particularly, the colors can be more easily recognized depending on the haze values.

As described above, the display device according to the exemplary embodiment of the inventive concept may include both transmissive and reflective modes such that the device can operate as a display or a mirror. In particular, the voltage difference applied for the reflective mode can be changed to provide the mirror mode in which various colors are exhibited.

While the inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the present disclosure.

What is claimed is:
1. A display device comprising:
   a display panel; and
   a polarization conversion panel disposed on the display panel,
   wherein the polarization conversion panel includes:
      a reflective polarizer disposed on the display panel, an absorptive polarizer facing and spaced apart from the reflective polarizer,
a lower electrode disposed on the reflective polarizer,
an upper electrode disposed on the absorptive polarizer, and
a liquid crystal layer disposed between the upper and lower electrodes;
wherein at least one of the lower electrode and the upper electrode includes a first sub-electrode and a second sub-electrode, and
wherein an adjustable voltage difference between a first voltage applied to the first sub-electrode and a second voltage applied to the second sub-electrode for displaying a plurality of user-adjustable interference color patterns including at least two colors.

2. The display device of claim 1, wherein:
at least one of the upper and lower electrodes includes a plurality of sub-electrodes electrically separated from each other, and
the plurality of sub-electrodes are divided into at least two regions according to voltages applied thereto.

3. The display device of claim 1, wherein the lower electrode includes:
a plurality of first sub-electrodes spaced apart by a predetermined interval;
an insulation layer disposed on the plurality of first sub-electrodes; and
a plurality of second sub-electrodes spaced apart from each other and disposed on the insulation layer so as to cross the plurality of first sub-electrodes.

4. The display device of claim 1, wherein the upper electrode includes:
a plurality of first sub-electrodes spaced apart by a predetermined interval;
an insulation layer disposed on the plurality of first sub-electrodes; and
a plurality of second electrodes spaced apart from each other and disposed on the insulation layer so as to cross the plurality of first sub-electrodes.

5. The display device of claim 1, wherein the lower electrode includes:
the first sub-electrode;
an insulation layer disposed on the first sub-electrode; and
the second sub-electrode disposed on the insulation layer, wherein
one of the first and second sub-electrodes has a planar shape, and the other one of the first and second sub-electrodes has a plurality of linear shapes.

6. The display device of claim 1, wherein the upper electrode includes:
the first sub-electrode;
an insulation layer disposed on the first sub-electrode; and
the second sub-electrode disposed on the insulation layer, wherein
one of the first and second sub-electrodes has a planar shape, and the other one of the first and second sub-electrodes has a plurality of linear shapes.

7. The display device of claim 1, wherein the upper and lower electrodes are formed of a transparent conductive oxide (TCO).

8. The display device of claim 2, wherein the at least two regions are independently driven.

9. The display device of claim 1, further comprising:
a first polarizer disposed between the display panel and the reflective polarizer, wherein a transmissive axis of the first polarizer and a transmissive axis of the reflective polarizers coincide with each other.

10. The display device of claim 9, wherein the transmissive axis of the reflective polarizer is perpendicular to the transmissive axis of the absorptive polarizer.

11. The display device of claim 9, wherein the transmissive axis of the reflective polarizer is parallel to the transmissive axis of the absorptive polarizer.

12. The display device of claim 9, wherein a reflective axis of the reflective polarizer is perpendicular to the transmissive axis of the reflective polarizer.

13. The display device of claim 9, further comprising:
a second polarizer disposed under the display panel, and
a light unit disposed under the second polarizer.

14. The display device of claim 1, wherein the display panel includes at least one of a liquid crystal display (LCD) panel, a plasma display panel (PDP), an organic light emitting diode display (OLED) panel, a surface conduction electron-emitter display (SED) panel, and a field emission display (FED) panel.

15. The display device of claim 2, wherein the polarization conversion panel is configured to exhibit the color patterns by applying different voltages to the at least two regions of the plurality of sub-electrodes.

16. The display device of claim 15, wherein the plurality of sub-electrodes include stripe-shaped linear members, and the color patterns include a colored stripe pattern.

* * * * *